United States Patent
Sailor et al.

(10) Patent No.: US 10,454,330 B2
(45) Date of Patent: Oct. 22, 2019

(54) MOTOR INCLUDING STATOR COOLING CHANNEL ADJACENT TO STATOR SLOTS

(71) Applicant: Ward Leonard Investment Holdings, LLC, Thomaston, CT (US)

(72) Inventors: Eric Sailor, Fort Wayne, IN (US); Daniel Cook, Terryville, CT (US); Alexander Gimmel, Hamden, CT (US); Alex Bridgemohan, Farmington, CT (US); Paul Matthews, Waterbury, CT (US); Myron Moroz, Burlington, CT (US)

(73) Assignee: WARD LEONARD INVESTMENT HOLDINGS, LLC, Thomaston, CT (US)

( * ) Notice: Subject to any disclaimer, the term of this patent is extended or adjusted under 35 U.S.C. 154(b) by 300 days.

(21) Appl. No.: 15/185,913

(22) Filed: Jun. 17, 2016

(65) Prior Publication Data
US 2016/0372985 A1 Dec. 22, 2016

Related U.S. Application Data

(60) Provisional application No. 62/181,831, filed on Jun. 19, 2015.

(51) Int. Cl.
*H02K 3/24* (2006.01)
*H02K 3/12* (2006.01)
*H02K 1/28* (2006.01)
*H02K 9/04* (2006.01)
*H02K 1/32* (2006.01)
*H02K 7/04* (2006.01)
*H02K 17/16* (2006.01)
*H02K 1/20* (2006.01)
*H02K 1/30* (2006.01)
*H02K 5/22* (2006.01)

(52) U.S. Cl.
CPC .............. *H02K 3/24* (2013.01); *H02K 1/20* (2013.01); *H02K 1/30* (2013.01); *H02K 1/32* (2013.01); *H02K 5/225* (2013.01); *H02K 7/04* (2013.01); *H02K 9/04* (2013.01); *H02K 17/165* (2013.01); *H02K 17/16* (2013.01)

(58) Field of Classification Search
CPC .. H02K 1/20; H02K 1/30; H02K 1/32; H02K 3/24; H02K 5/225; H02K 7/04; H02K 9/04; H02K 17/16; H02K 17/165
USPC ............................... 310/59, 61, 58, 201, 214
See application file for complete search history.

(56) References Cited

U.S. PATENT DOCUMENTS

| | | | |
|---|---|---|---|
| 1,476,776 A | 12/1923 | Stamm et al. | |
| 1,916,339 A | 7/1933 | Smith | |
| 2,469,820 A * | 5/1949 | Fuge | H02K 9/04 310/58 |
| 2,494,200 A * | 1/1950 | Ramqvist | H02K 9/06 310/52 |
| 5,183,975 A | 2/1993 | Craggs et al. | |
| 5,306,972 A | 4/1994 | Hokanson et al. | |

(Continued)

Primary Examiner — John K Kim
(74) Attorney, Agent, or Firm — McCormick, Paulding & Huber LLP

(57) ABSTRACT

A motor including a stator including a plurality of stator slots having stator coils disposed therein, and a rotor rotatable within the stator about a central axis. The stator includes a plurality of stator channel formed adjacent to the stator slots and extending in the axial direction of the central axis.

25 Claims, 24 Drawing Sheets

(56) References Cited

U.S. PATENT DOCUMENTS

| | | | |
|---|---|---|---|
| 5,861,700 A * | 1/1999 | Kim | H02K 1/32 310/216.119 |
| 7,157,818 B2 | 1/2007 | Jones | |
| 7,714,467 B2 | 5/2010 | Pfannschmidt | |
| 7,902,699 B2 * | 3/2011 | Pellegrino | H02K 1/32 310/52 |
| 9,130,434 B2 | 9/2015 | Chamberlin et al. | |
| 9,279,458 B2 | 3/2016 | Nixon | |
| 2003/0173861 A1 * | 9/2003 | Kawaguchi | H02K 1/246 310/61 |
| 2008/0106157 A1 * | 5/2008 | Higashimura | H01B 1/24 310/45 |
| 2009/0085421 A1 * | 4/2009 | Saito | H02K 3/12 310/214 |
| 2010/0019626 A1 * | 1/2010 | Stout | H02K 1/02 310/60 A |
| 2010/0156207 A1 * | 6/2010 | Pellegrino | H02K 1/32 310/59 |
| 2011/0227431 A1 * | 9/2011 | Af Ursin | F28D 15/0275 310/54 |
| 2012/0086291 A1 * | 4/2012 | DeBlock | H02K 1/20 310/61 |
| 2014/0070642 A1 * | 3/2014 | Lang | G06F 17/5018 310/59 |
| 2014/0265666 A1 * | 9/2014 | Shoykhet | H02K 1/20 310/59 |
| 2014/0265737 A1 * | 9/2014 | Yagi | H02K 15/0006 310/425 |
| 2015/0077034 A1 * | 3/2015 | Kaneko | H02K 1/2766 318/722 |
| 2016/0118862 A1 * | 4/2016 | Maki-Ontto | H02K 9/02 310/59 |
| 2016/0372985 A1 * | 12/2016 | Sailor | H02K 3/24 |

* cited by examiner

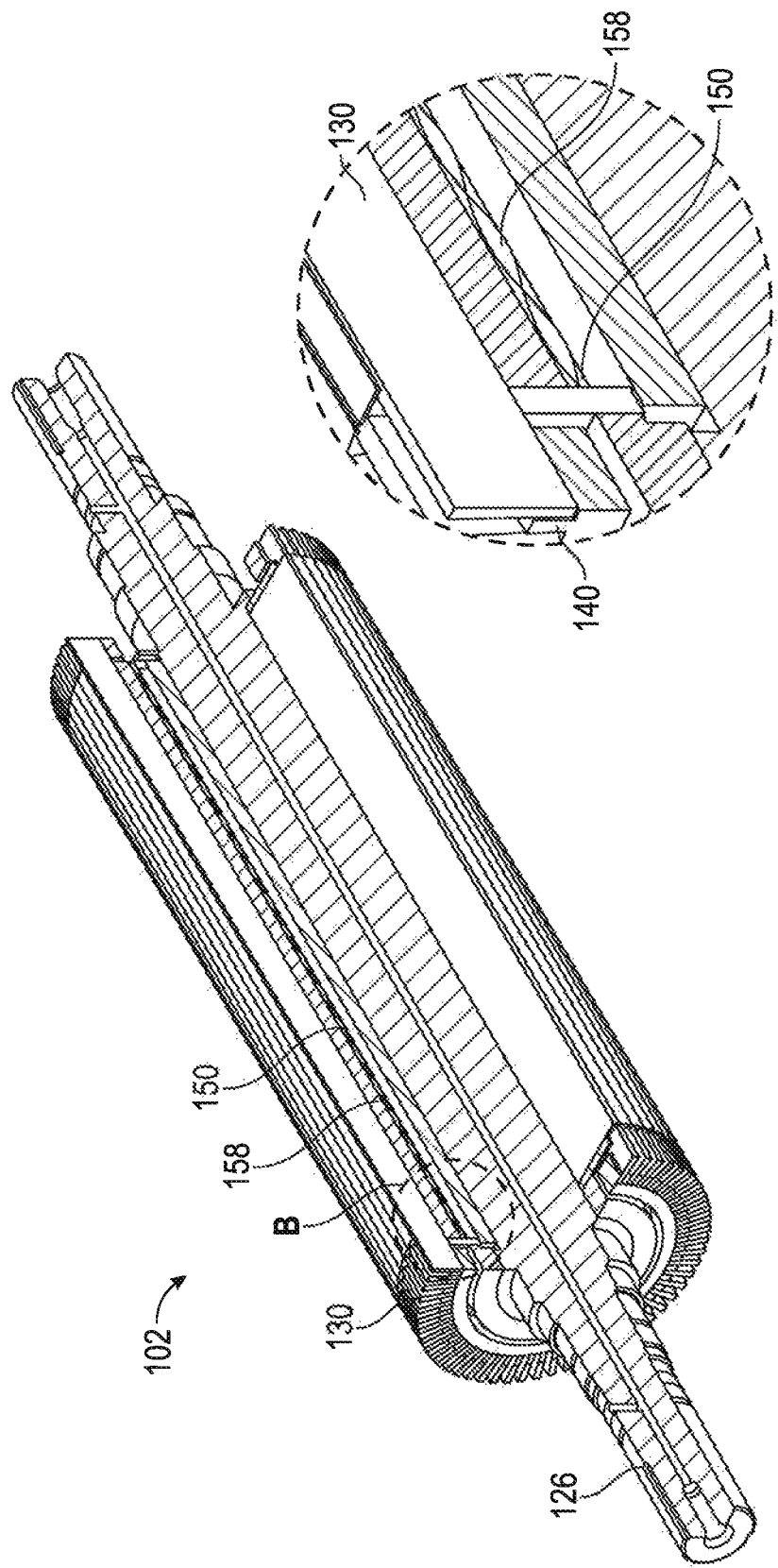

MOTOR INCLUDING STATOR COOLING CHANNEL ADJACENT TO STATOR SLOTS

CROSS-REFERENCE TO PRIOR APPLICATION

This application claims priority to U.S. Provisional Patent Application No. 62/181,831, filed Jun. 19, 2015, which is hereby incorporated herein by reference in its entirety.

TECHNICAL FIELD

The present disclosure relates generally to electric machines and, more particularly, to high power density electric machines.

BACKGROUND

Motors may be used to convert electric energy into mechanical energy for a wide variety of applications such as, for example, industrial applications. During operation of alternating current ("AC") induction and direct current ("DC") motors, efficiency of the motor may be lost at least in part due to heat generation as thermal energy. The accumulation of thermal energy in an AC induction or DC motor may also cause degradation of its materials and, thus, loss of integrity of the motor, particularly in a high power density motor, which has reduced size and/or weight relative to the horsepower output by the motor.

SUMMARY

According to the present disclosure, a motor comprises a motor housing, a stator mounted within the motor housing and having a plurality of stator slots formed therein, a plurality of stator coils disposed in at least one of the stator slots, and a rotor having a rotor core and a shaft being rotatable within the stator about a central axis, wherein the stator forms at least one stator channel, wherein the stator channels are located between the stator coils and the rotor.

These and other aspects, features and advantages of the present disclosure will become apparent in light of the following detailed description of non-limiting embodiments, with reference to the accompanying drawings.

BRIEF DESCRIPTION OF THE DRAWINGS

FIG. 16B is cut-away, perspective view of the rotor of FIG. 16A;

FIG. 16C is an enlarged view of enlargement circle B of FIG. 16B;

DETAILED DESCRIPTION

Before the various embodiments are described in further detail, it is to be understood that the present disclosure is not limited to the particular embodiments described. It will be understood by one of ordinary skill in the art that the devices described herein may be adapted and modified as is appropriate for the application being addressed and that the devices described herein may be employed in other suitable applications, and that such other additions and modifications will not depart from the scope thereof.

Although various features have been shown in different figures for simplicity, it should be readily apparent to one of skill in the art that the various features may be combined without departing from the scope of the present disclosure.

Figure 1A:
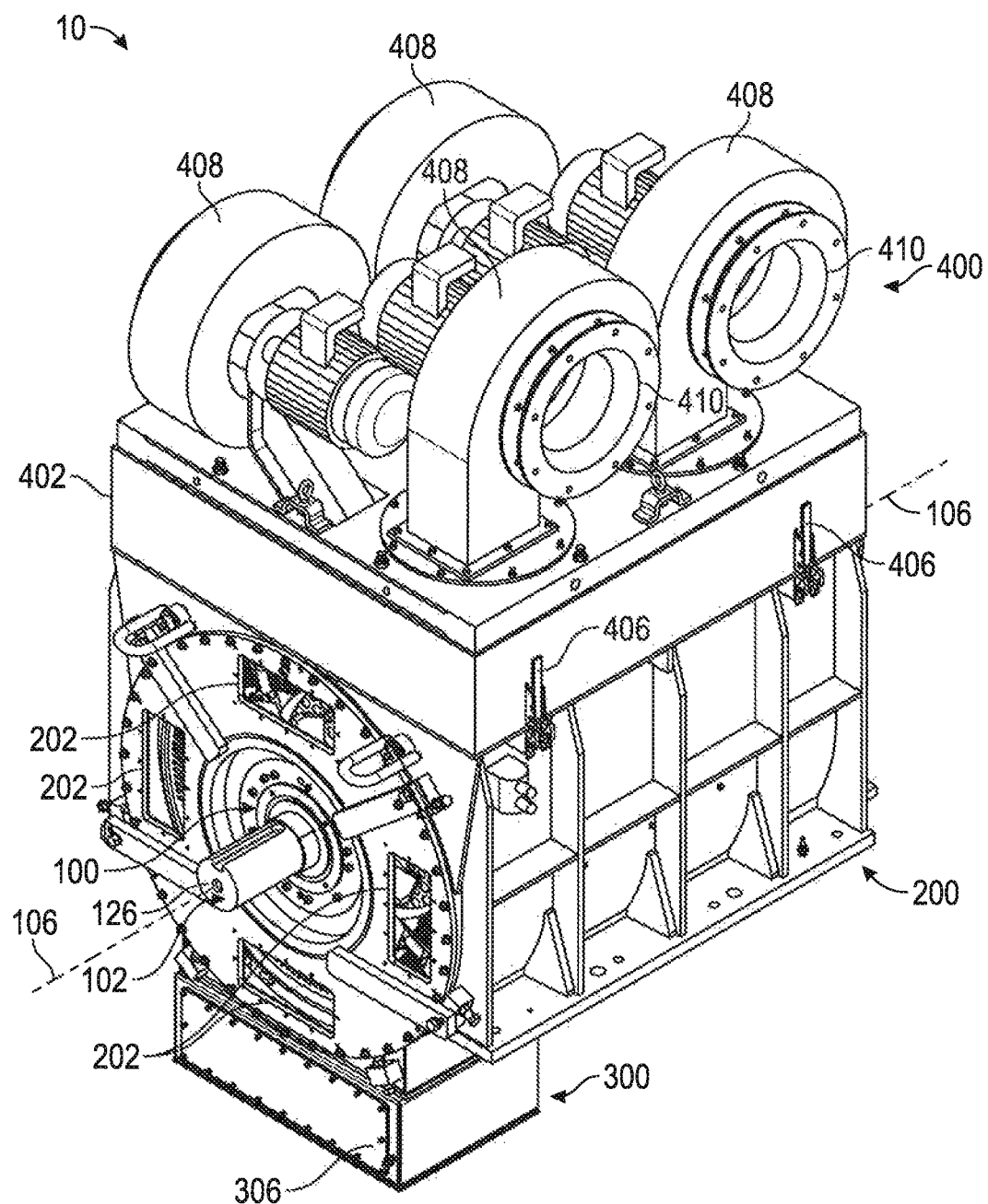
FIG. 1A is a perspective view of an exemplary motor.
Figure 1B:
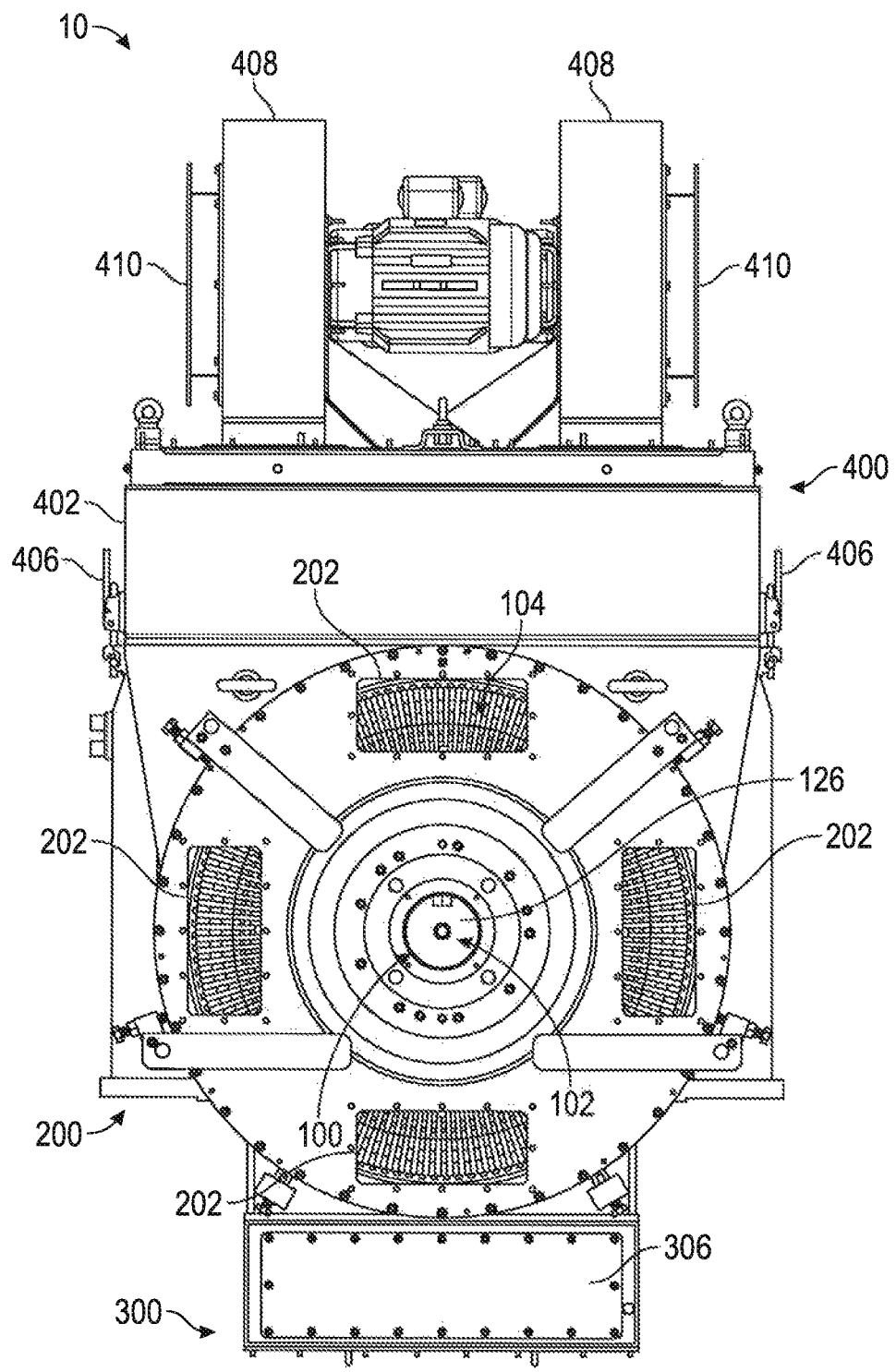
FIG. 1B is a front view of the exemplary motor of FIG. 1A.
Figure 1C:
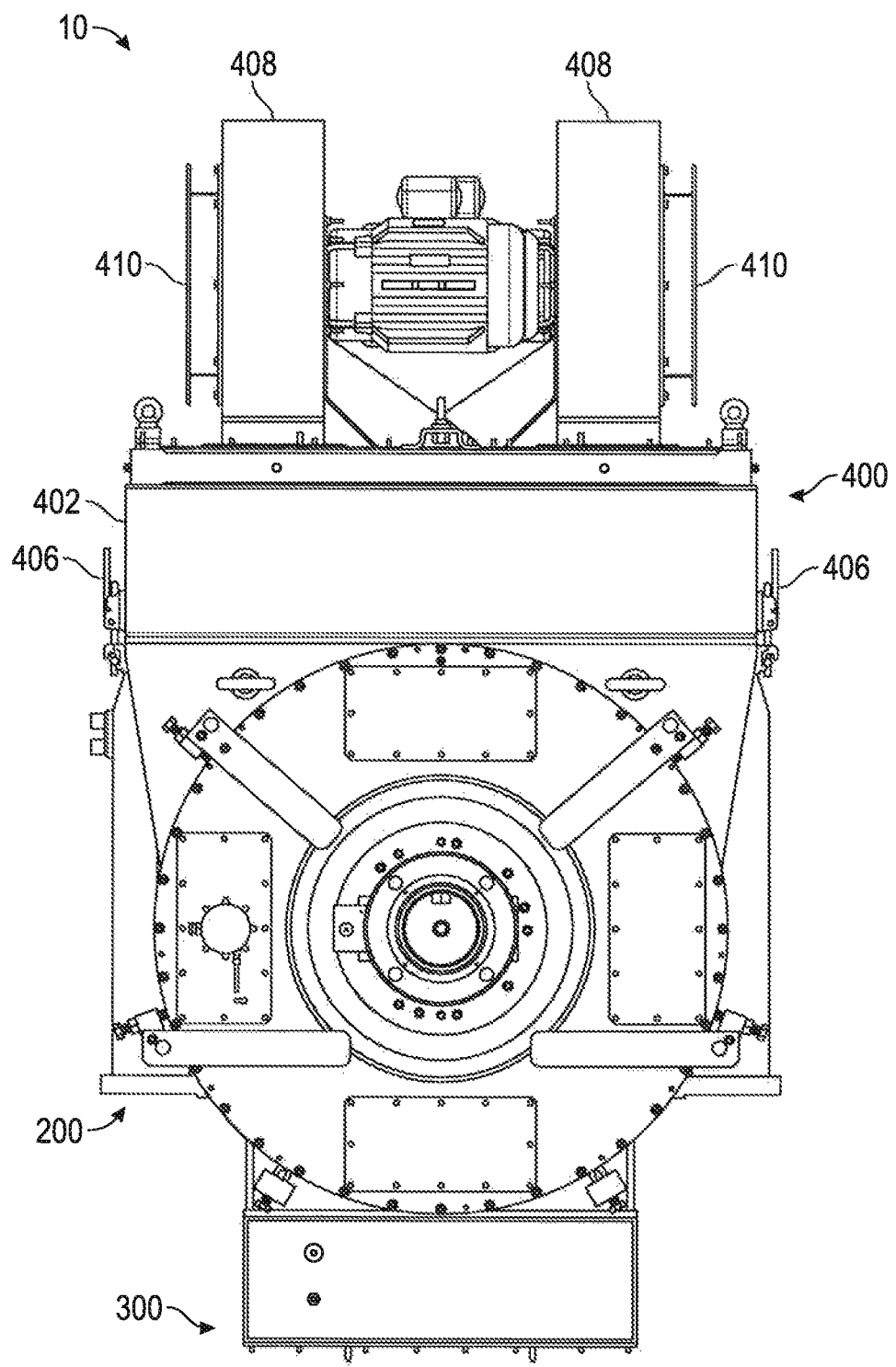
FIG. 1C is a rear view of the exemplary motor of FIG. 1A.

FIGS. 1A-1C show an exemplary motor 10 according to principles of the present disclosure. In this document the term "motor" has been used to represent all electric machines for simplicity. The exemplary motor 10 shown in FIGS. 1A-1C is an AC induction motor. However, it should be readily understood that many of the various features and aspects of the exemplary motor 10 discussed below may be as equally applicable to other types of motors, including DC motors, as they are to AC motors. The exemplary motor 10 may be a high power density motor, which is an electric motor possessing high power output per unit volume of the motor relative to other electric motors of comparable power output. High power density motors are advantageous in applications where high power output is desired, but where space for the motor is constrained.

Figure 2A:
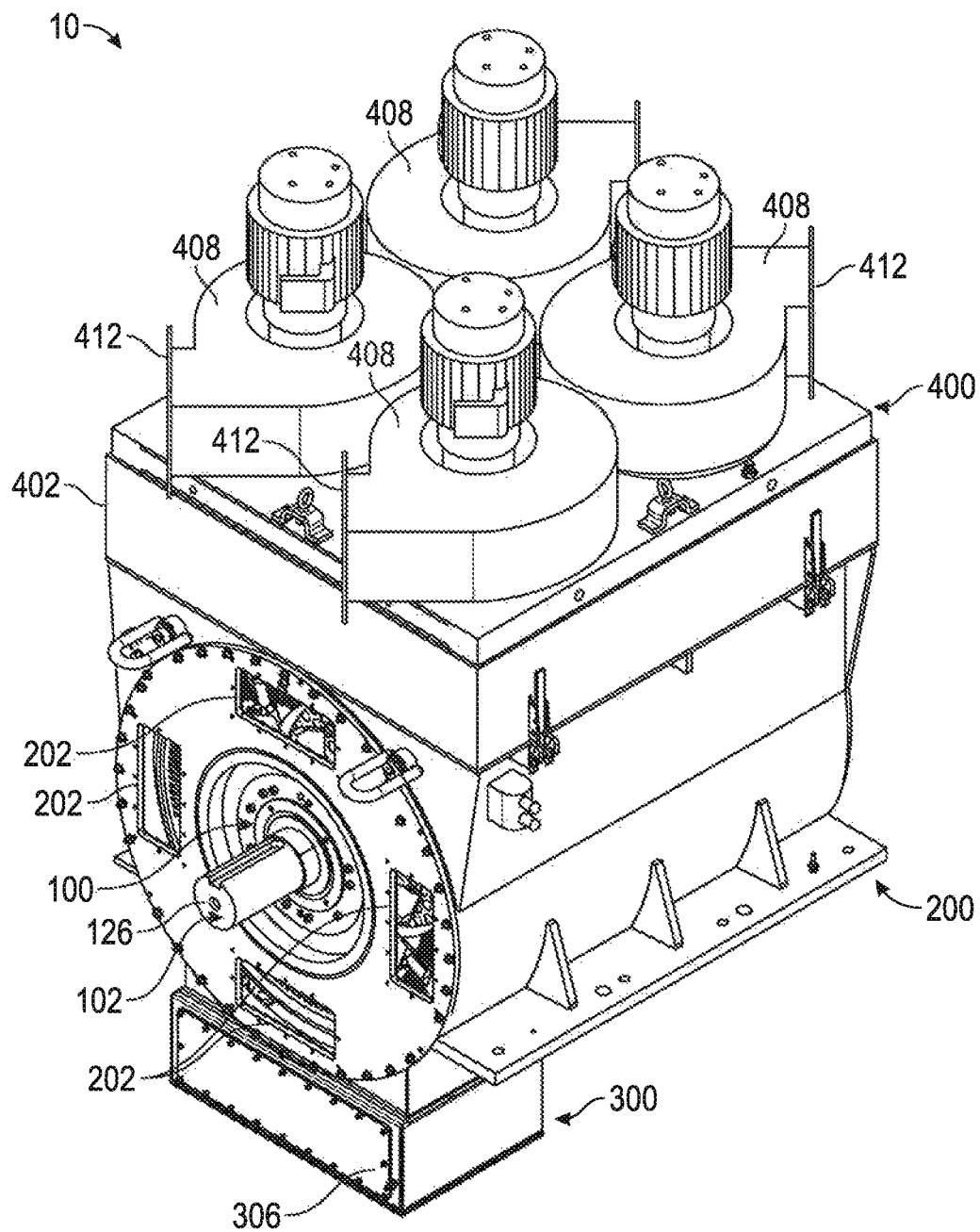
FIG. 2A is a perspective view of the exemplary motor of FIG. 1A with a different blower configuration.
Figure 2B:
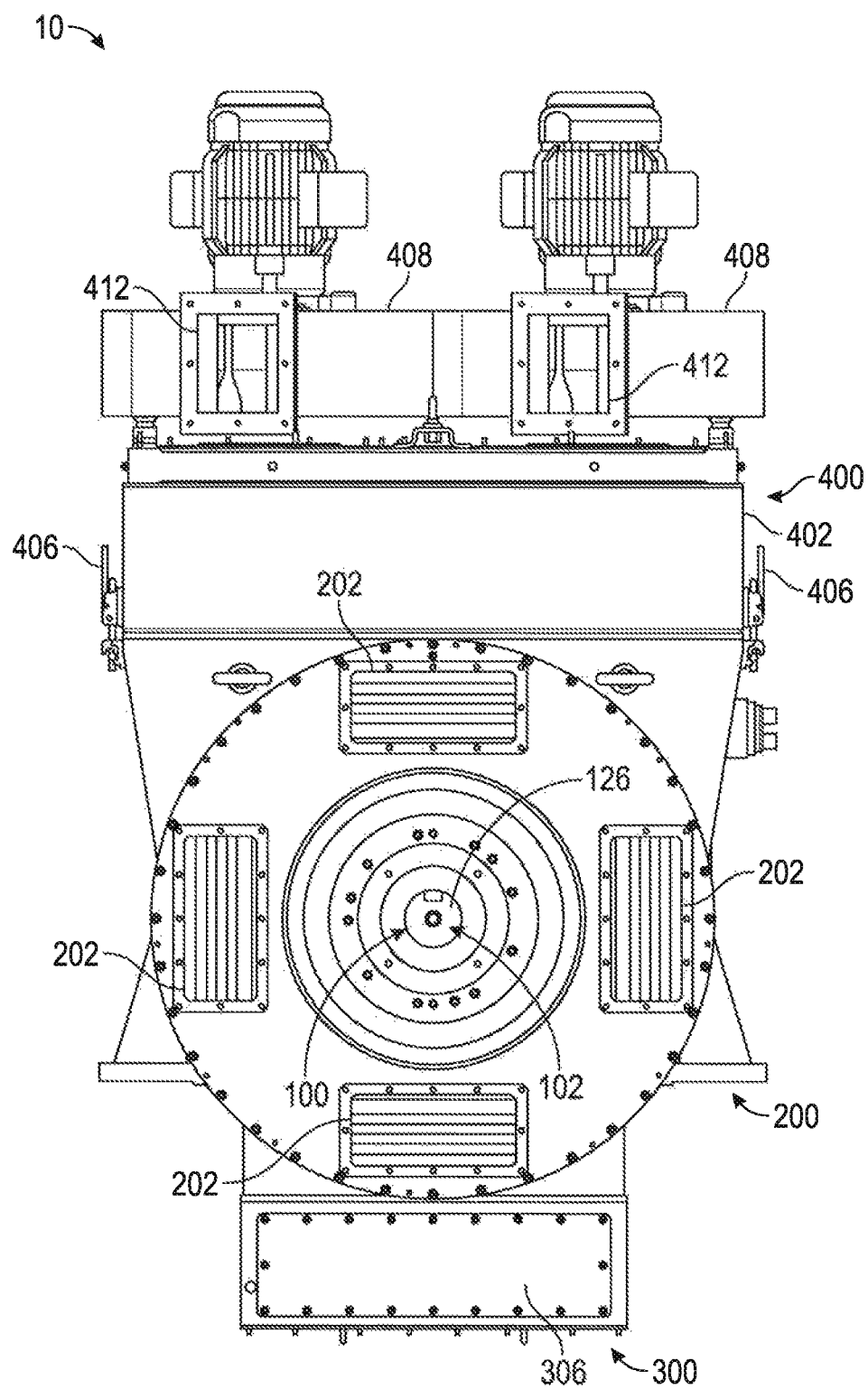
FIG. 2B is a front view of the exemplary motor of FIG. 2A.
Figure 2C:
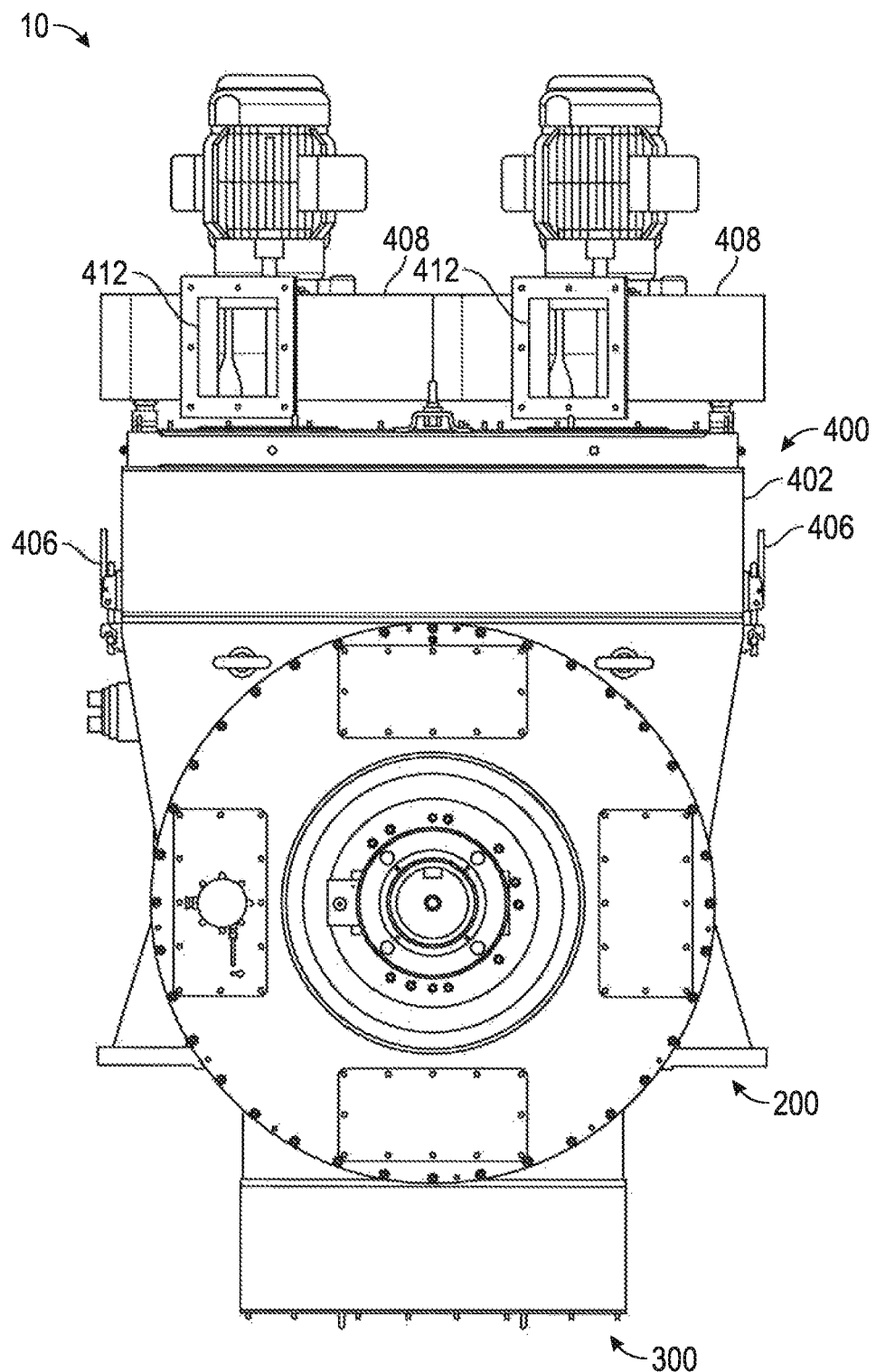
FIG. 2C is a rear view of the exemplary motor of FIG. 2A.

The motor 10 comprises a motor assembly 100, motor housing 200, terminal box assembly 300 and a fan module assembly 400. The motor assembly 100 is mounted within motor housing 200. The terminal box assembly 300 is mounted on a bottom side of the motor housing 200. The fan module assembly 400 is mounted on a top side of the motor housing 200. It should be understood, however, that the motor 10 can be designed in various other configurations such that the terminal box assembly 300 and fan module assembly 400 are mounted on various other locations of the motor housing 200 than as shown depending upon intended applications for the motor 10. For example, the terminal box assembly 300 could be mounted on a side of the motor housing 200, the fan module assembly 400 could be mounted on the bottom of the motor housing 200, or the terminal box assembly 300 and fan module assembly 400 could be mounted on any other suitable surface of the motor housing 200. Additionally, as shown in FIGS. 1A-1C, the motor 10 may have a first blower configuration for the fan module assembly 400 in which cooling air is blown into the motor housing 200, as discussed below, or, alternatively, the as shown in FIGS. 2A-2C, the motor 10 may have a second blower configuration for the fan module assembly 400 in which negative pressure is generated to draw cooling air through the motor housing 200 and into the fan module assembly 400, as discussed below.

Figure 6:
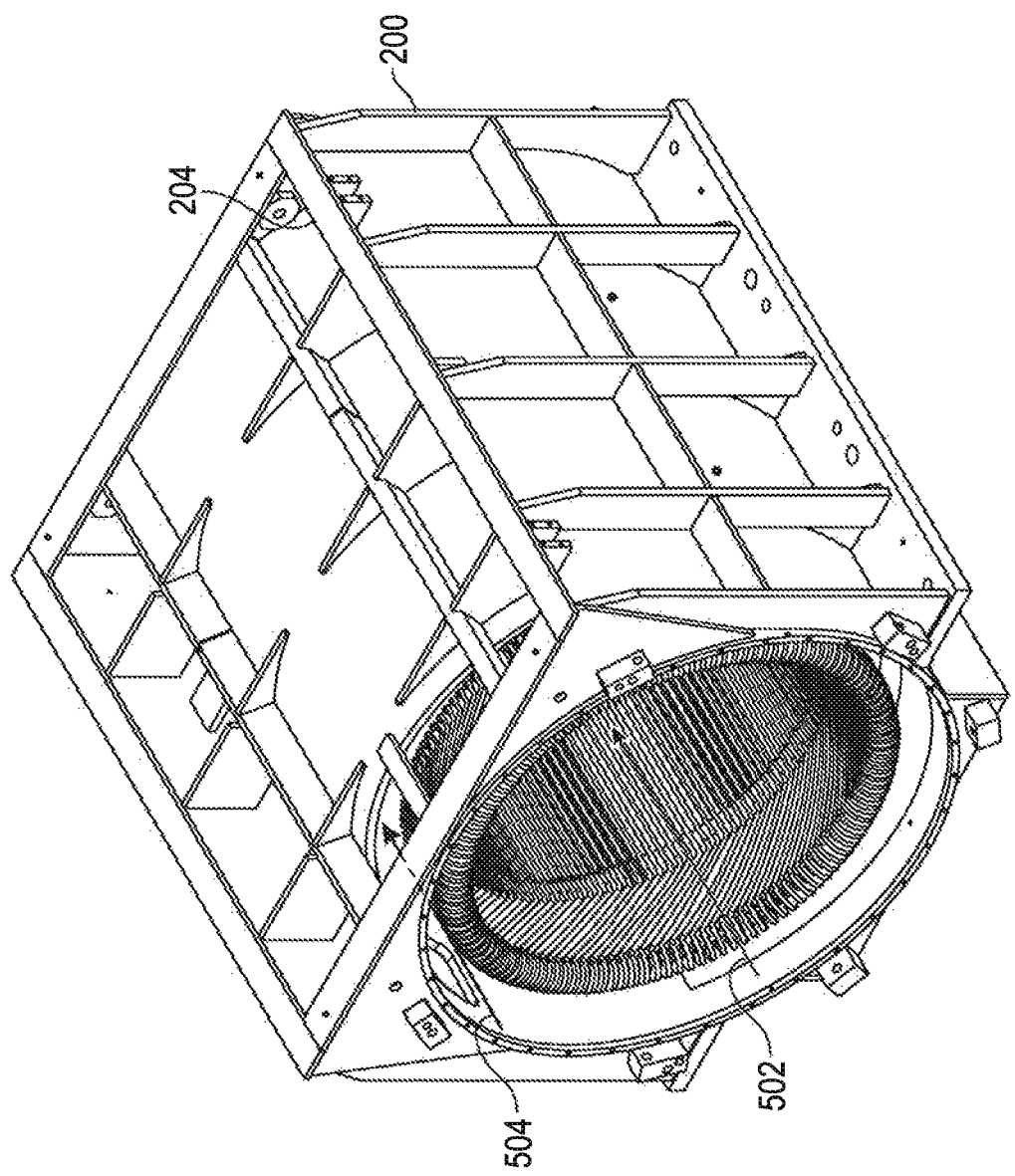
FIG. 6 is a rear, perspective view of the stator and motor housing of FIG. 4A.
Figure 7:
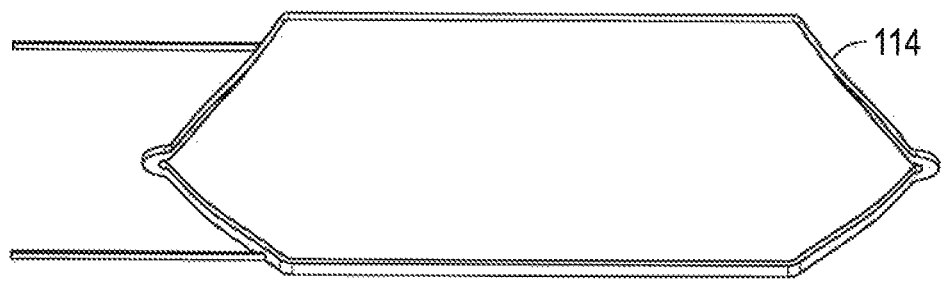
FIG. 7 is a perspective view of a stator coil of the exemplary motor of FIG. 1A.

The motor housing 200 includes at least one air inlet 202 to allow air to pass between an exterior of the motor housing 200 and an interior of the motor housing 200. The motor housing 200 of the exemplary motor 10 shown in FIGS. 1A-1C has four air inlets 202. However, it should be readily understood that the motor housing 200 may be designed with any number of air inlets 202. The motor housing 200 includes an air outlet 204, shown in FIG. 6, which may be seen through the top of the motor housing 200 when the fan module assembly 400 is removed. While air inlets 202 and air outlet 204 are described with the terms "inlet" and "outlet," it should be readily understood that the motor 10 in accordance with principles of the present disclosure may be designed to have reverse air flows, as will be discussed below, where air inlets 202 would serve as outlets for air moving through the motor housing 200 and air outlet 204 would serve as an inlet for air moving through motor housing 200.

Figure 3:
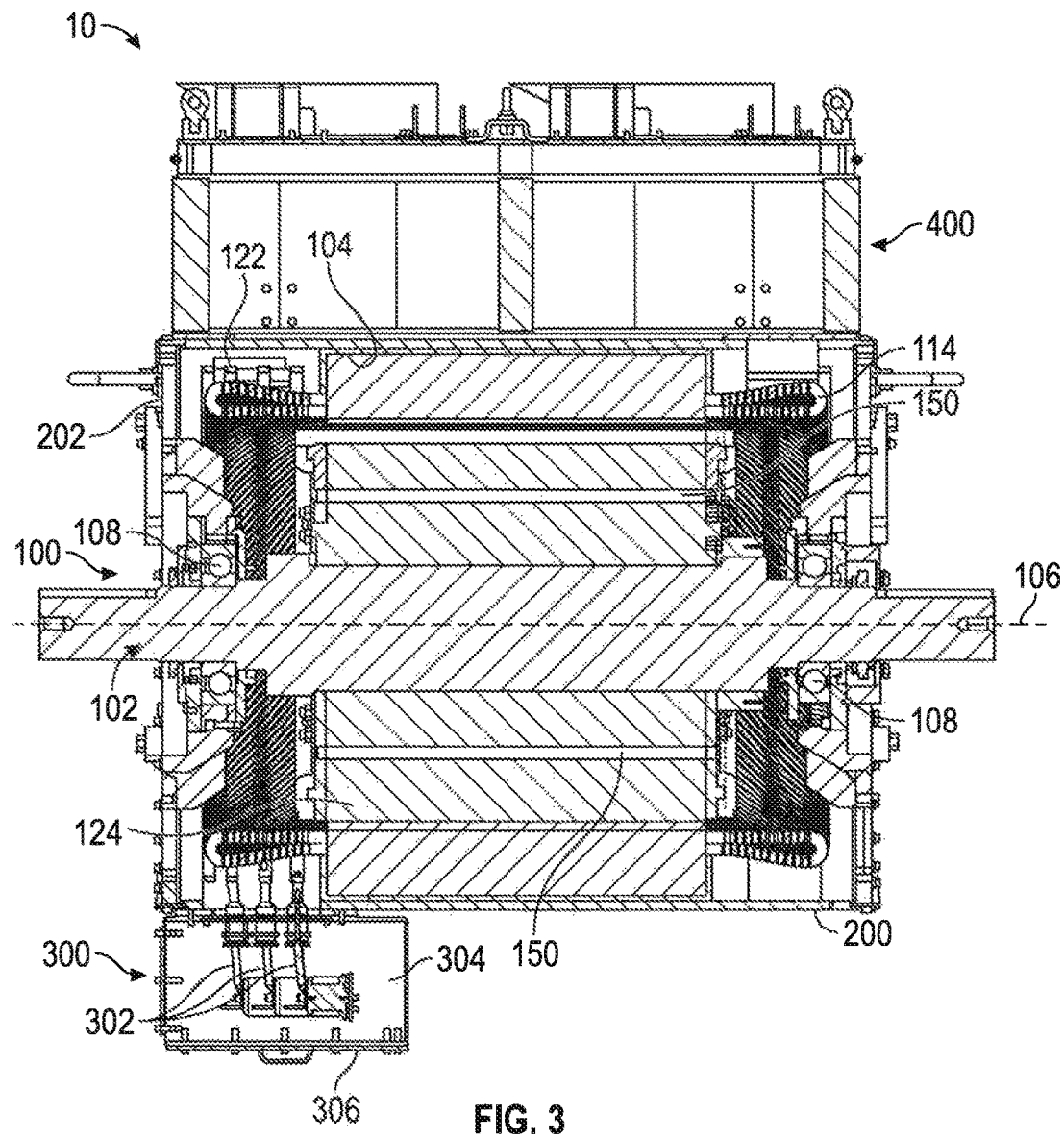
FIG. 3 is a cross-sectional, side view of the exemplary motor of FIG. 1A.
Figure 4A:
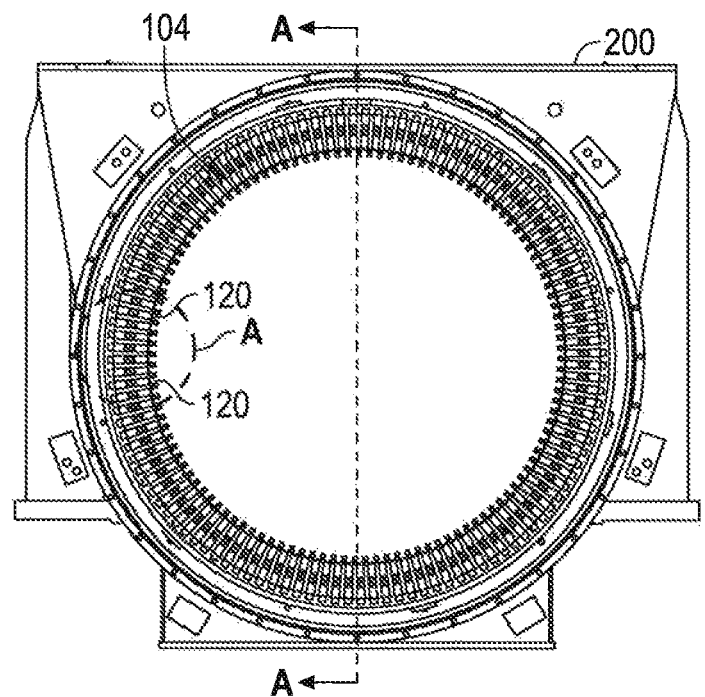
FIG. 4A is a cross-sectional, front view of a stator mounted in a motor housing of the exemplary motor of FIG. 1A.
Figure 4B:
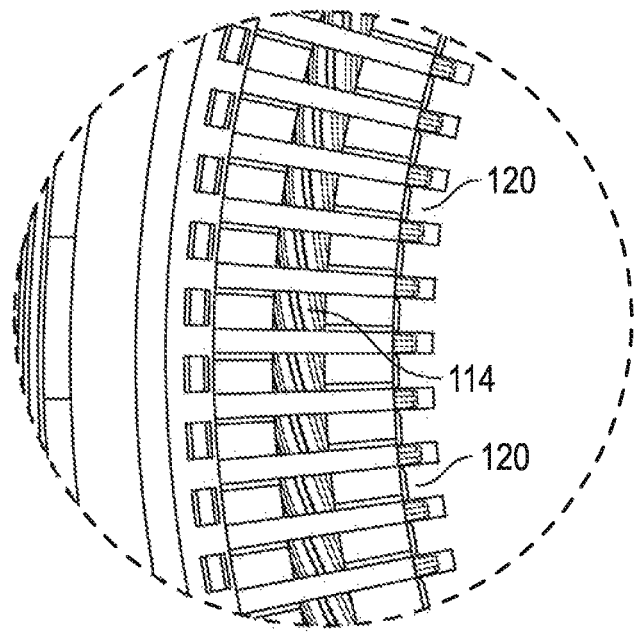
FIG. 4B is an enlarged view of enlargement circle A of FIG. 4A.
Figure 10:
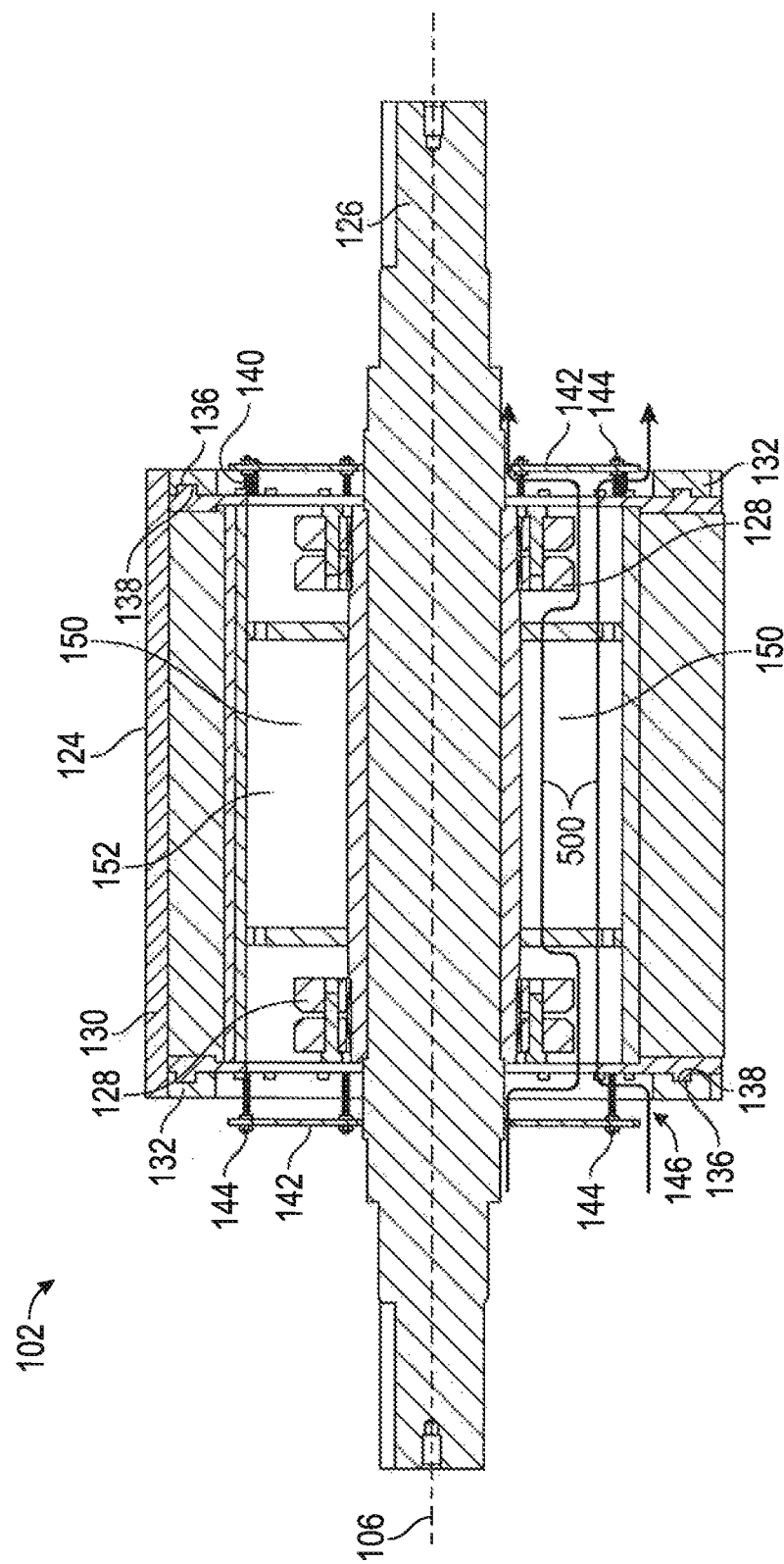
FIG. 10 is a cross-sectional, side view of the rotor of FIG. 9 along section line A-A.

With reference to FIGS. 1A-1C and 3, the motor assembly 100 comprises a rotor 102, more clearly shown in FIG. 10, and a stator 104, shown in FIG. 3. The rotor 102 is rotatable within the stator 104 about central axis 106 and is rotatably mounted to the motor housing 200 with ball bearings 108, shown in FIG. 3, or the like.

Figure 8:
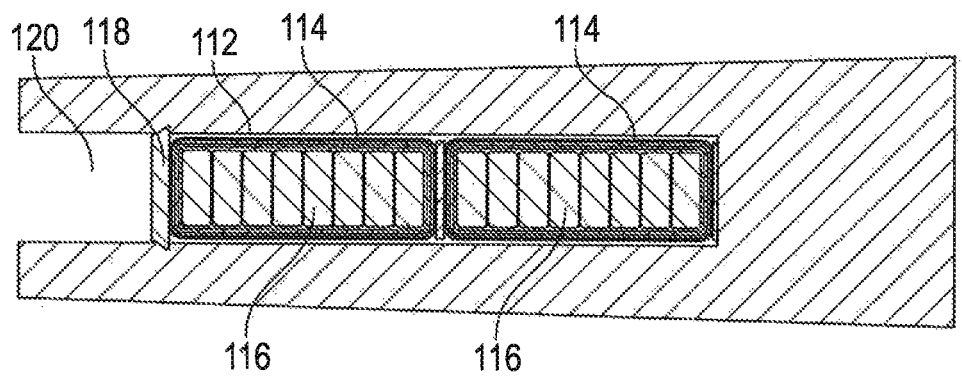
FIG. 8 is cross-sectional view of a portion of the stator of the exemplary motor of FIG. 1A.

Referring to FIGS. 4A, 4B, 5, 7 and 8, the stator 104 comprises a core pack assembly 110 having a plurality of stator slots 112 formed therein. Each stator slot 112 may have one or more stator coils 114 disposed therein. Each stator coil 114 has one or more coils 116, as seen in FIG. 8, where two exemplary coils 116 are shown in the same stator slot 112. The coils 116 are positioned within the stator slots 112 and insulated therein and, also, mechanically constrained against electromagnetic forces by a slot wedge 118. Formed in the stator 104, adjacent to each slot wedge 118, is a stator channel 120. The stator channels 120 are located in between the stator coils 114 and the rotor 102. The stator 104 includes one or more phase rings 122 to electrically connect the stator coils 114.

Figure 9:
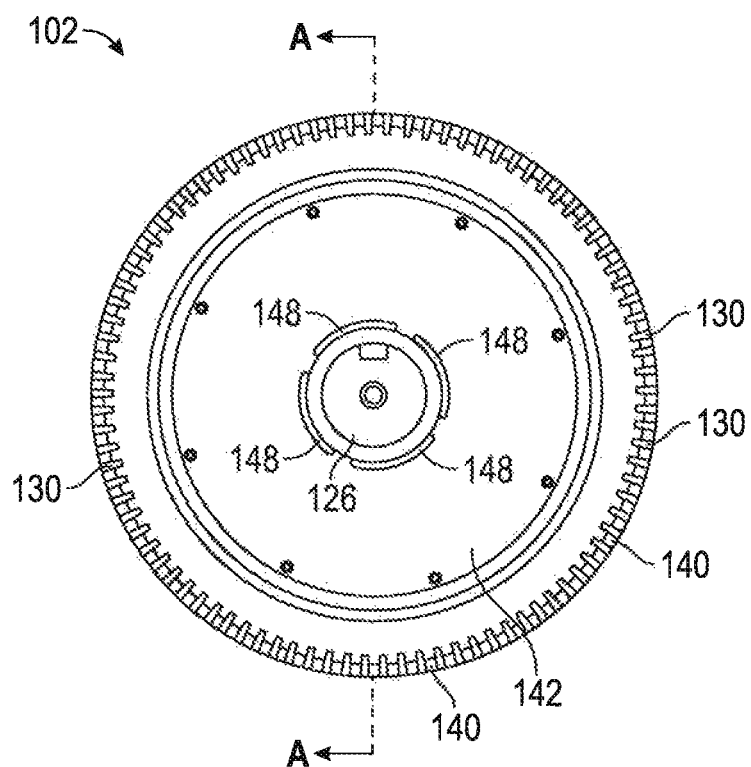
FIG. 9 is a front view of a rotor of the exemplary motor of FIG. 1A.

Referring to FIGS. 9 and 10, the rotor 102 includes a rotor core 124, shown in FIG. 10, on a shaft 126 that is mounted to the motor housing 200 by bearings 108, shown in FIG. 3, or the like, as discussed above. As seen in FIG. 10, the rotor core 124 may be advantageously mounted to the shaft 126 through two quick change connections 128. The quick change connections 128 hold the rotor core 124 on the shaft 126 yet allow the rotor core 124 to be quickly removed therefrom through the use of a quick change tool to allow, for example, easy and rapid replacement of the rotor core 124 or shaft 126 if damaged or otherwise deemed unusable during use.

The type of quick change connections 128 employed in the motor 10 may be similar to various known quick change connection mechanisms and may include, for example, a circular component, bending and moving components, adjustable force amplifying components and interfacing components. The quick change connections 128 provide a removable anti-rotational force and anti-lateral movement force between the rotor core 124 and the shaft 126 by applying multiple small movements that increase or decrease stress of flexible members, or interlocking distances between movable members associated with the rotor core 124 and the shaft 126. Alternatively, the quick change connections 128 may include threaded components that are located at different positions when the quick change connections 128 provide anti-rotation force and the anti-lateral force versus when the quick change connections 128 provide no force. Through the use of quick change connections 128, the present disclosure advantageously allows for the rotor core 124 to be connected and/or disconnected from the shaft 126 without the need to apply heat to parts of the motor 10.

Figure 11:
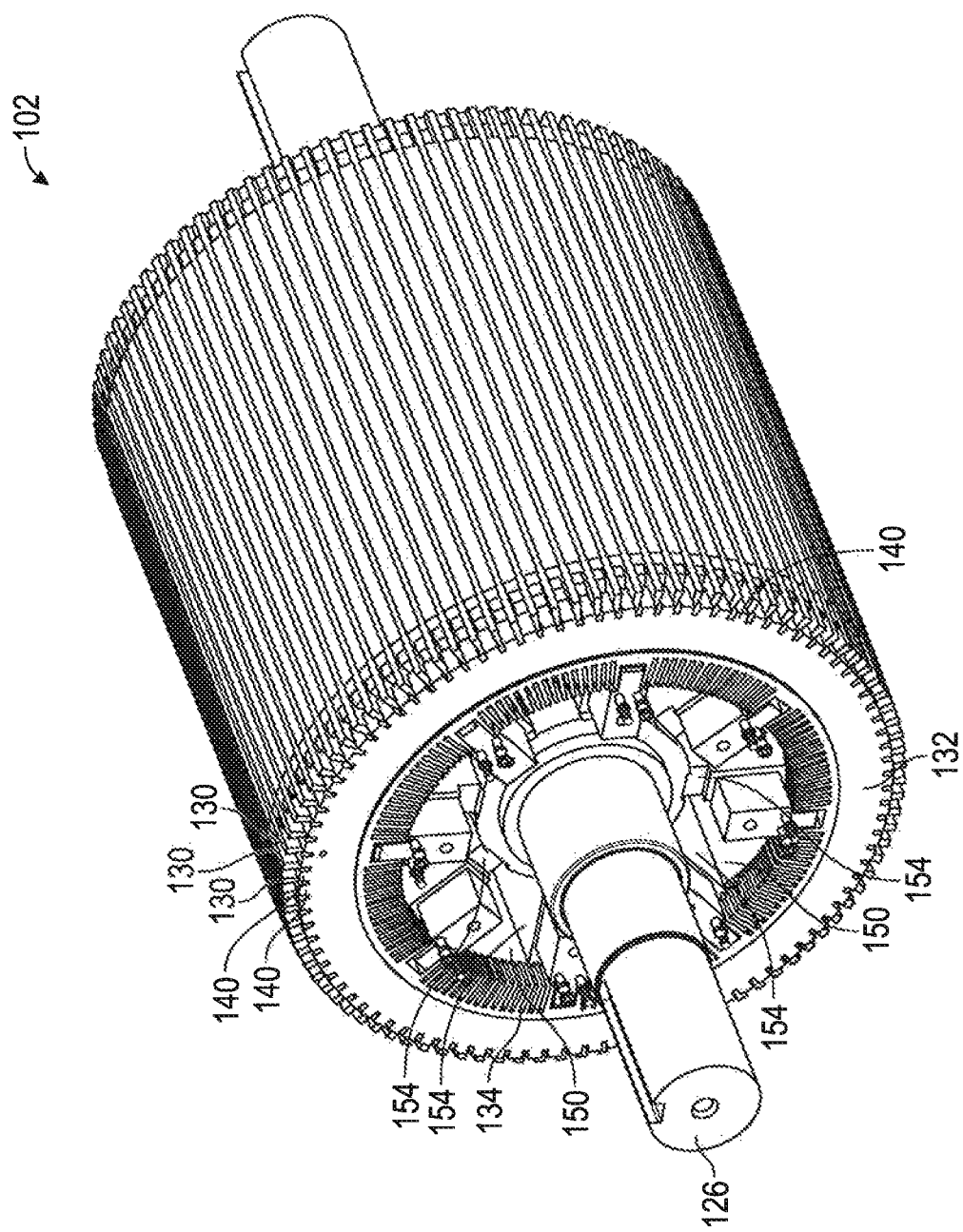
FIG. 11 is a perspective view of the rotor of FIG. 9 without a deflector plate shown.

Referring to FIGS. 10 and 11, the rotor core 124 has a plurality of rotor bars 130 attached to the exterior thereof. The rotor bars 130 may be connected to the outer ring of the rotor core 124 through an end ring 132 at each axial end of the rotor core 124. The end ring 132 may include a dovetail connection that slides on axially and advantageously allows the rotor 102 to be constructed axially shorter than other connection methods. For example, on an axially inner portion of each end ring 132 there is a recess 136 formed therein that mates with a corresponding mating boss 138 formed on the rotor core 124. The end rings 132 and the dovetail connection with the rotor core 124 advantageously inhibits radial expansion during operation of the motor 10 due to, for example, thermal or other forces. Thus, the dovetail connection improves the integrity and stability of the rotor 102 during operation. While this dovetail connection has been shown and described as the end ring 132 having a recess and the rotor core 124 having a mating boss, it should be readily understood that, in accordance with principles of the present disclosure, the reverse may be true to form an alternative dovetail connection that provides the same advantages discussed above, i.e. the rotor core 124 may be formed with a recess or recesses and the end rings 132 formed with a mating boss or mating bosses.

As shown in FIG. 11, a heat sink 134 may be mounted on a portion of each end ring 132 to help draw heat from the rotor 102 to a cooling path through the rotor discussed in greater detail below. Positioning the heat sink 134 on the end rings 132 increases a surface area of the heat producing components exposed to the cooling path, which improves heat removal efficiency for cooling air being moved through the motor 10 during operation.

As seen in FIG. 10, the rotor also includes adjustable deflector plates 142, which may be moved axially in or out relative to the rotor core 124 along their support screws 144 to increase or decrease the size of passage 146 between the outer edge of the deflector plates 142 and the rotor core 124, thereby controlling an airflow supply of cooling air that is passed through the rotor core 124. The deflector plates 142 are configured so that the shaft 126 may extend through an inner area of each deflector plate 142. The deflector plates 142 may have one or more additional air vents 148 at an inner diameter of the deflector plate 142. The deflector plates 142 may be moved to desired positions for controlling an airflow supply of cooling air to be passed through the rotor core 124 while simultaneously deflecting high velocity air onto the inner surface of the rotor end rings 132 and heat sinks 134 mounted thereon, thereby providing additional cooling to heat generating portions of the rotor 102. As should be understood by those skilled in the art, any exposed surface of the rotor 102 will benefit from the deflected air passing over said surface. Additionally, the additional air vents 148 also advantageously support heat removal by providing cooling air to pass along the shaft 126 to stir up airflow near the shaft 126 where the bearings 108 generate heat.

Figure 12:
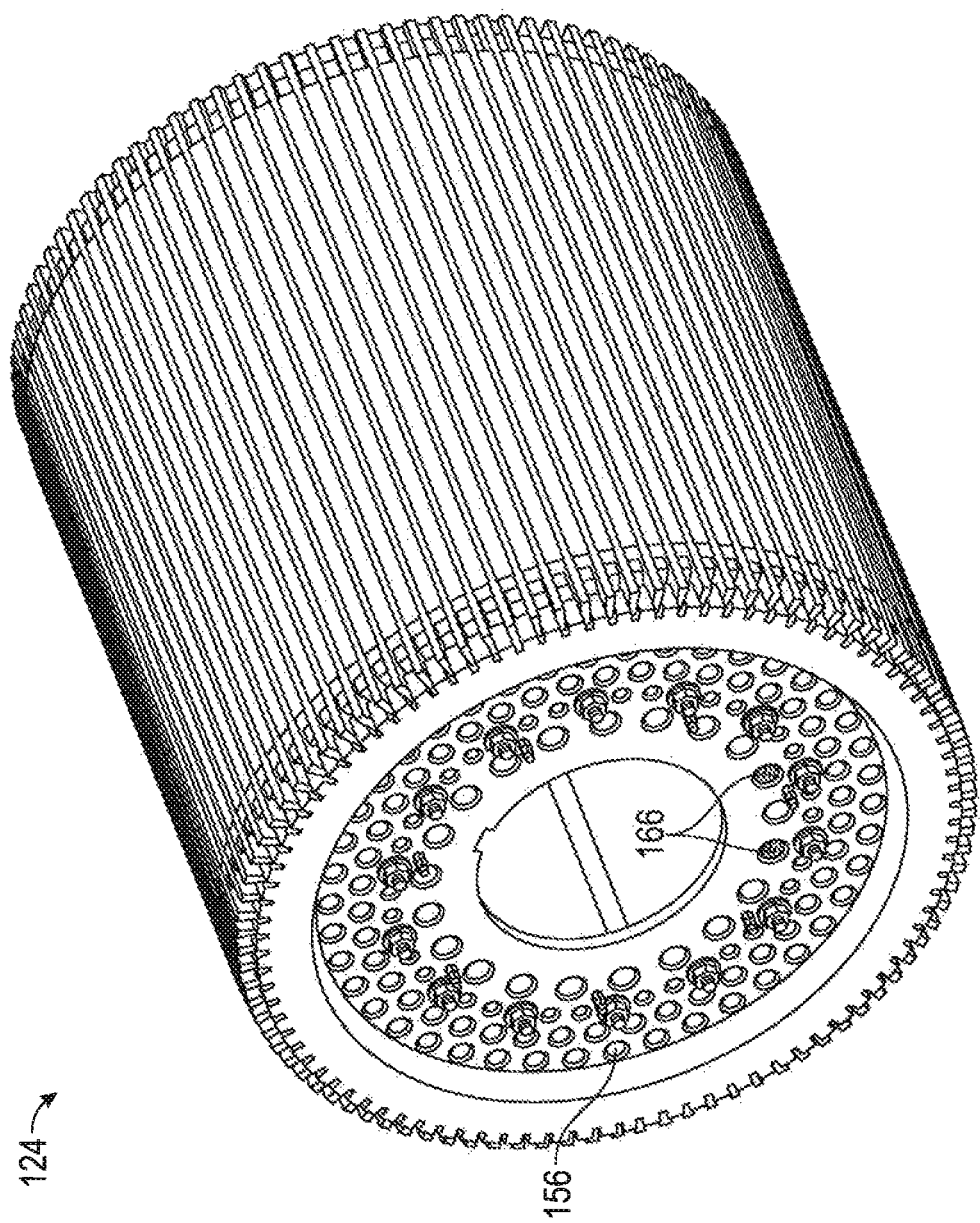
FIG. 12 is a perspective view of the rotor of FIG. 9 without a deflector plate, heat sink or shaft shown.
Figure 13:
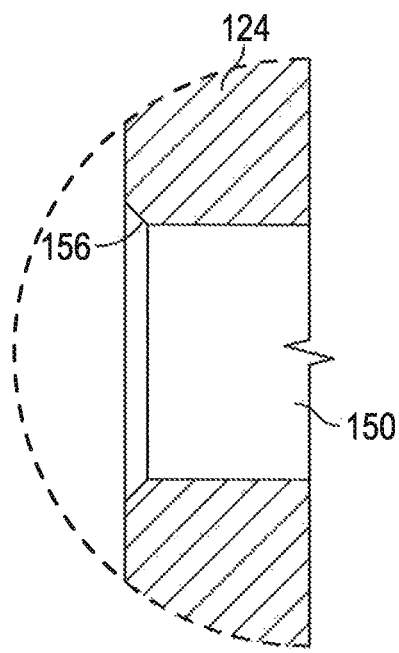
FIG. 13 is a cross-sectional, side view of an exemplary rotor vent formed in the rotor of FIG. 12.
Figure 14:
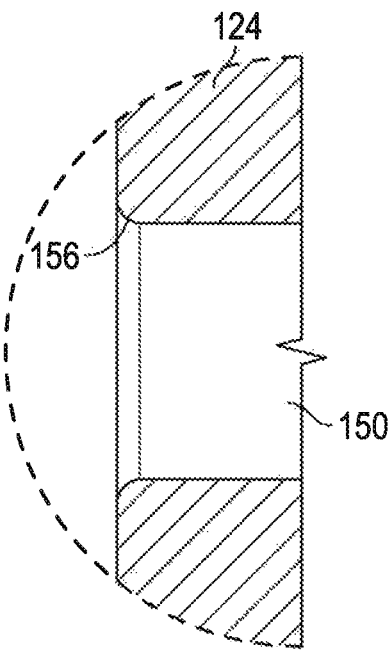
FIG. 14 is a cross-sectional, side view of an exemplary rotor vent formed in the rotor of FIG. 12.
Figure 15:
FIG. 15 is a side view of an exemplary turbulator of the rotor of the exemplary motor of FIG. 1A.
Figure 16A:
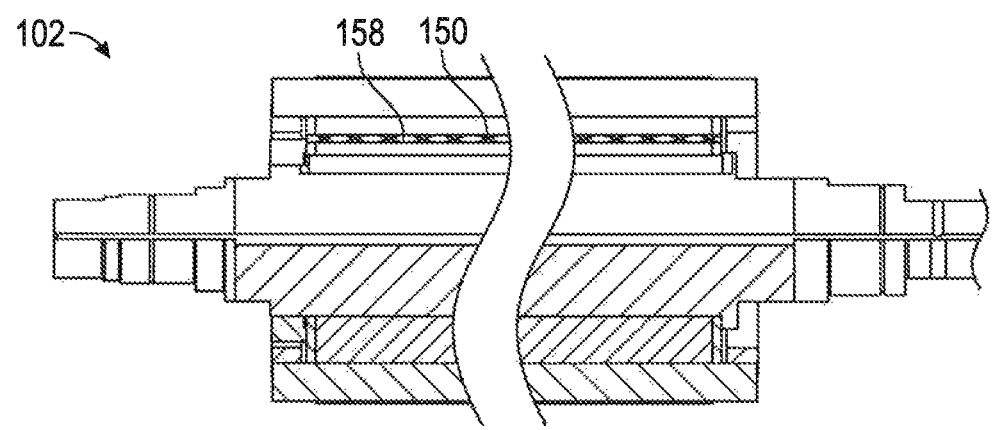
FIG. 16A is a cross-sectional, side view of a rotor of the exemplary motor of FIG. 1A with the turbulator.

As shown in FIG. 3, the rotor core 124 may have a plurality of rotor vents 150 formed therein extending from one axial end of the rotor core 124 to the other axial end of the rotor core 124. Alternatively, referring to FIGS. 10 and 11, the rotor vents 150 may be formed as passages 152 extending in an axial direction of the rotor core 124 from one end to the other between struts or legs 154, shown in FIG. 11, supporting the rotor core 124 on the shaft 126. As shown in FIG. 12, each rotor vent 150 has entry and/or exit holes 156 at each axial end. The rotor vent holes 156 may have a sharp, i.e. stamped approximately 90 degree, entrance or may advantageously have a shaped entrance to improve airflow therethrough. For example, the rotor vent holes 156 may be shaped by a chamfered edge, as shown in FIG. 13, leading into and/or out of the rotor vent 150 to provide a smoother transition that reduces turbulent flow at the entrance. Although shown with a single chamfer, it should be readily understood that the transition may be formed with an increased number of chamfered edges to simulate a curved entrance, further smoothing the transition and reducing turbulent flow. Alternatively, as shown in FIG. 14, the rotor vent holes 156 may be formed with a curved radius leading into and/or out of the rotor vents 150 such that there are no discontinuities formed in the edge. Holes 156 formed with the curved radius at the entrance/exit of the rotor vent 150 may provide an even smoother transition that minimizes turbulent flow.

The rotor vents 150 with holes 156 formed as the entry and/or exits provide improved airflow during operation of the motor 10. The holes 156 being formed with chamfered or sloped edges in the rotor core 124 advantageously minimizes turbulence of cooling air entering the rotor vents 150 thereby reducing entrance and exit fluid drag.

Referring to FIGS. 15 and 16A-16C, each rotor vent 150 may have a turbulator 158 disposed therein. The turbulators 158 are irregular elongated metal sheets that, when disposed in rotor vents 150, form multiple obstructions for airflow in the rotor vents 150 that churn up cooling air within the rotor vents 150 during operation. Thus, the turbulators 158 increase turbulence of air flow within the rotor vents 150 to improve heat removal from the rotor core 124 during operation.

Figure 17:
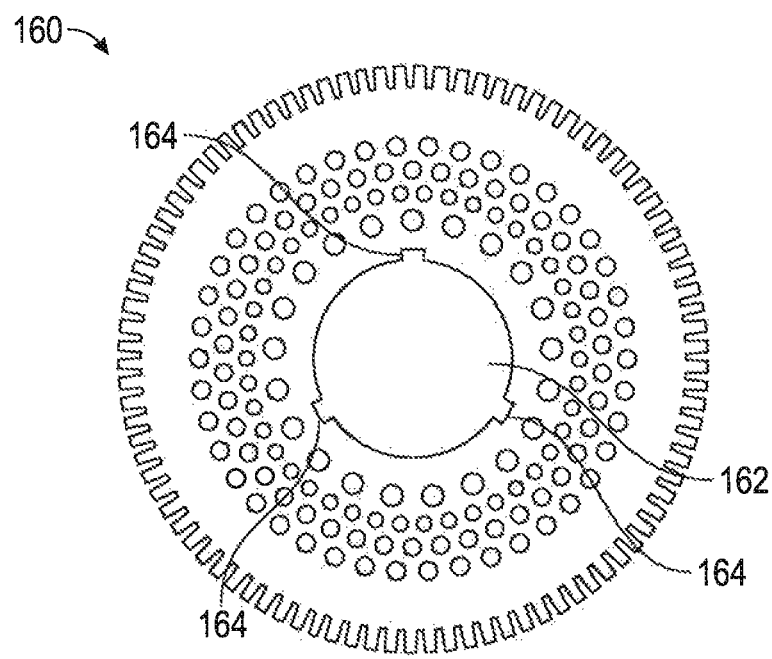
FIG. 17 is a front view of a rotor core lamination of the exemplary motor of FIG. 1A.

The rotor core 124, shown in FIGS. 10-12, may be formed by a series of stacked laminations arranged adjacent to one another. FIG. 17 shows a single such lamination 160 of the rotor core 124, shown in FIGS. 10-12. Each lamination 160 includes a centrally located shaft opening 162, shown in FIGS. 17 and 18, that is sized and shaped to appropriately receive shaft 126. Each lamination 160 has at least one keyway 164 formed in a periphery of the opening 162 to allow the lamination to be stacked on a rotor shaft having a corresponding key that fits within the keyway 164. As shown in FIG. 17, each lamination 160 is provided with three keyways 164 spaced apart from each other evenly at 120 degree intervals. As discussed above, the rotor core 124 is formed by a series of stacked laminations 160 and these laminations 160 may have variations in weight distribution and/or density within each lamination 160. Therefore, providing each lamination 160 with the three evenly spaced keyways 164 allows for balancing of the laminations 160 during assembly of the rotor core 124 by allowing the laminations 160 to be rotated an interval equal to the angular degree spacing of the keyways 164, i.e. 120 degrees in the exemplary motor 10 described above. As should be readily understood from the present disclosure, the laminations 160 may include one or more keyways 164 and the one or more keyways 164 may also be evenly spaced angularly apart from one another. Increasing the number of keyways 164 provided in the laminations 160 offers more rotation options for balancing, but also, may incur more manufacturing costs for formation of the keyways 164 as well as weights and fillers used to fill the unused keyways 164.

Figure 18:
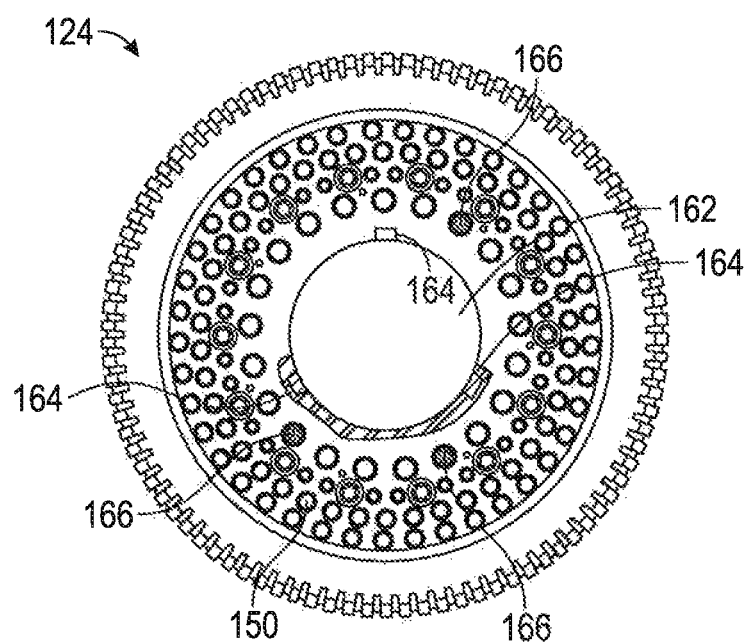
FIG. 18 is a front view of a rotor core of the exemplary motor of FIG. 1A.

Referring to FIGS. 12 and 18, the rotor core 124 may also have one or more balance slugs 166 disposed in one or more of the rotor vents 150, as necessary, in order to further balance the rotor core 124. The balance slugs 166 have a shape that conforms to the rotor vents 150 so as not to come loose during operation of the motor 10, shown in FIGS. 1A-1C. Also shown in FIG. 18, in the partial cutaway portion, the two unused keyways 164 are filled for balancing purposes. The material used for the balance slugs 166 and/or for filling the unused keyways 164 may be selected from any suitable filling materials including, without limitation, metals, polymers, ceramics, hybrid compounds, or the like.

The balance slugs 166 may advantageously be disposed in rotor vents 150 that are more closely located to an inner radius of the rotor core 124 than other rotor vents 150. This may require more balance slugs 166 to be used in order to properly balance the rotor 102, but may also provide an advantage as the motor 10 heats up during operation because there will be less of a change in balance of the rotor 102 since the moments generated by the balance slugs 166 on the rotor 102 will be located closer to the central axis 106 when compared to other balancing techniques. Since a significant number of rotor vents 150 may be formed in the rotor 102, the addition of the vent slugs 166 to some of the rotor vents will not impair cooling of the motor 10. Additionally, the balance slugs 166 may advantageously be inserted into the rotor vents 150 that will provide the least amount of cooling reduction so as to minimize a drop in cooling efficiency due to the addition of the vent slugs 166. The use of balance slugs 166 advantageously allows for balancing of the rotor 102 without the need to use fasteners to attach weights to the rotor 102 and/or the need to remove material from the rotor 102.

Figure 19:
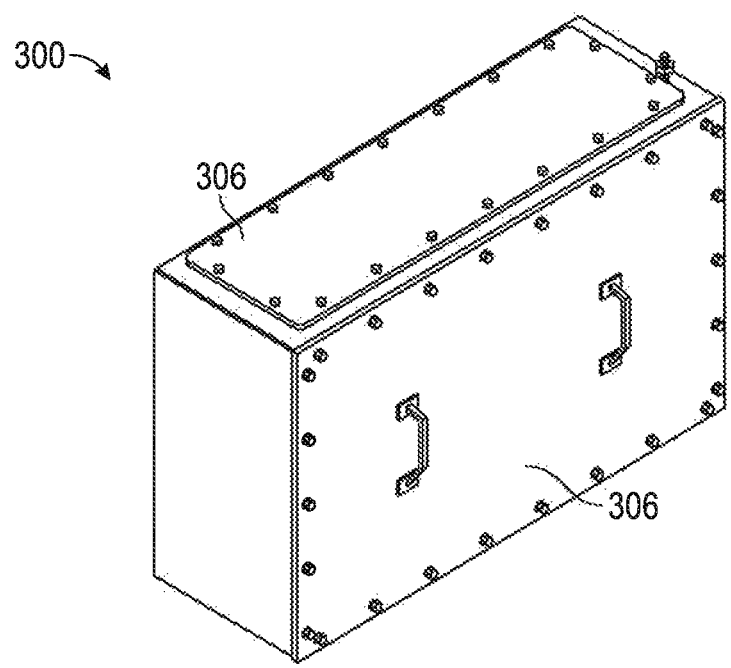
FIG. 19 is a perspective view of a terminal box assembly of the exemplary motor of FIG. 1A.
Figure 20:
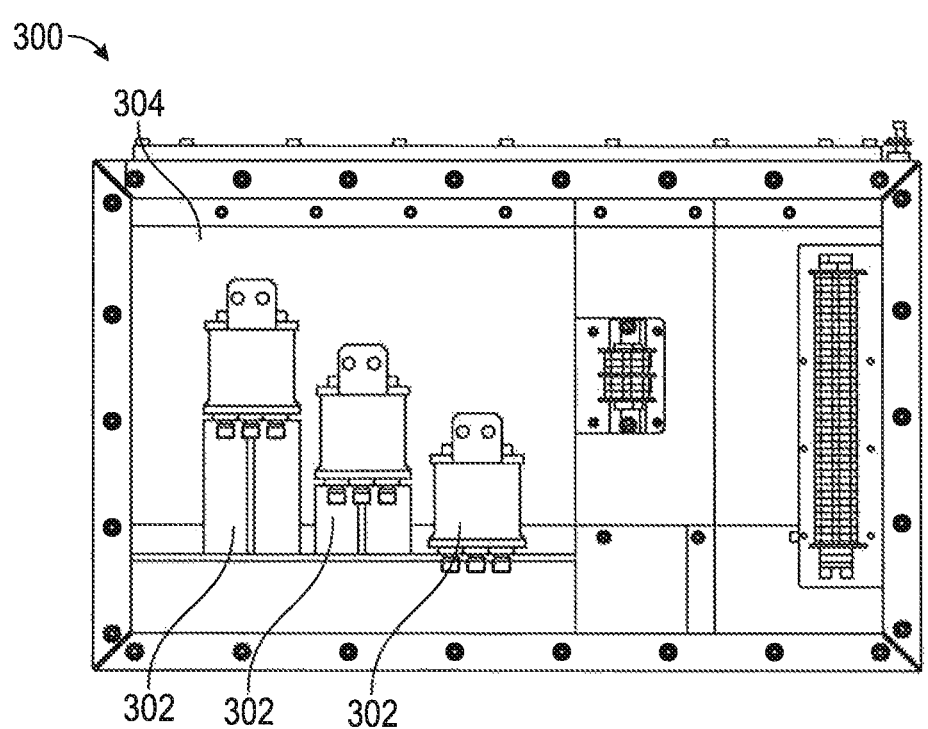
FIG. 20 is a top view of the terminal box assembly of FIG. 17 with a cover and gasket not shown.
Figure 21:
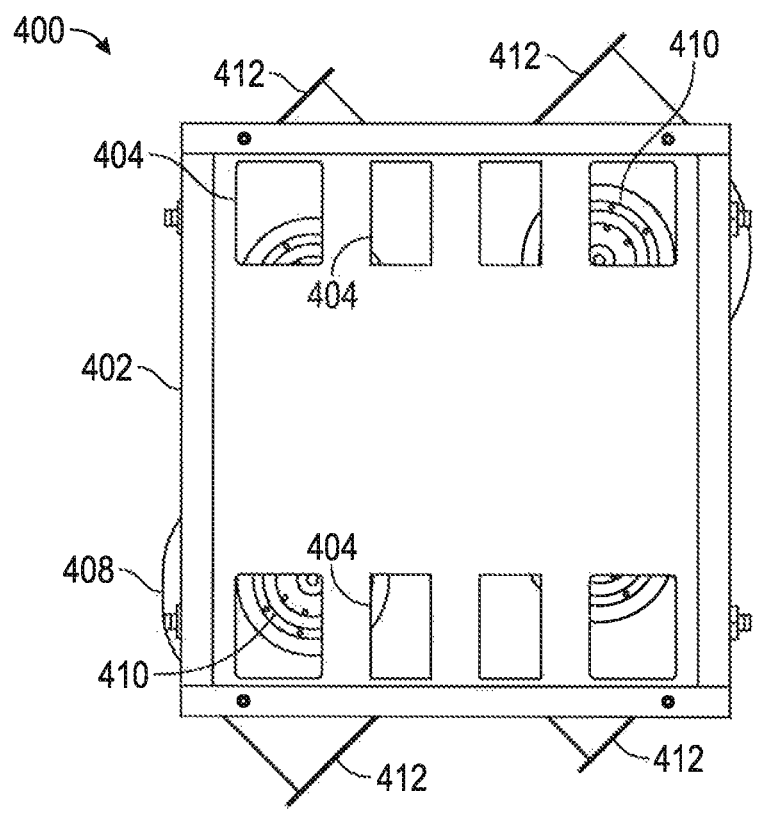
FIG. 21 is a bottom view of a fan module assembly of the exemplary motor of FIG. 2A.
Figure 22:
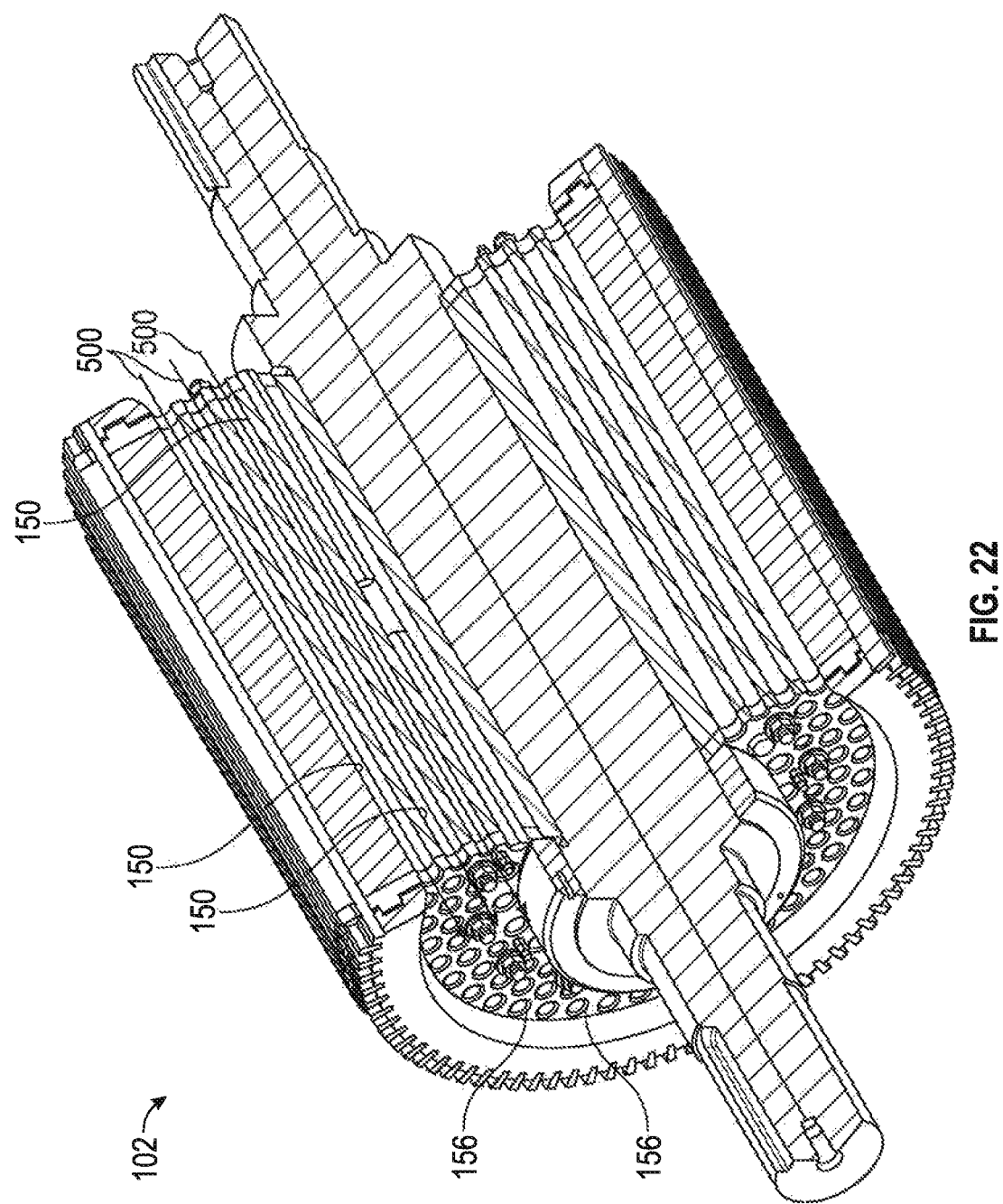
FIG. 22 is a cut-away, perspective view of a rotor of the exemplary motor of FIG. 1A.
Figure 23:
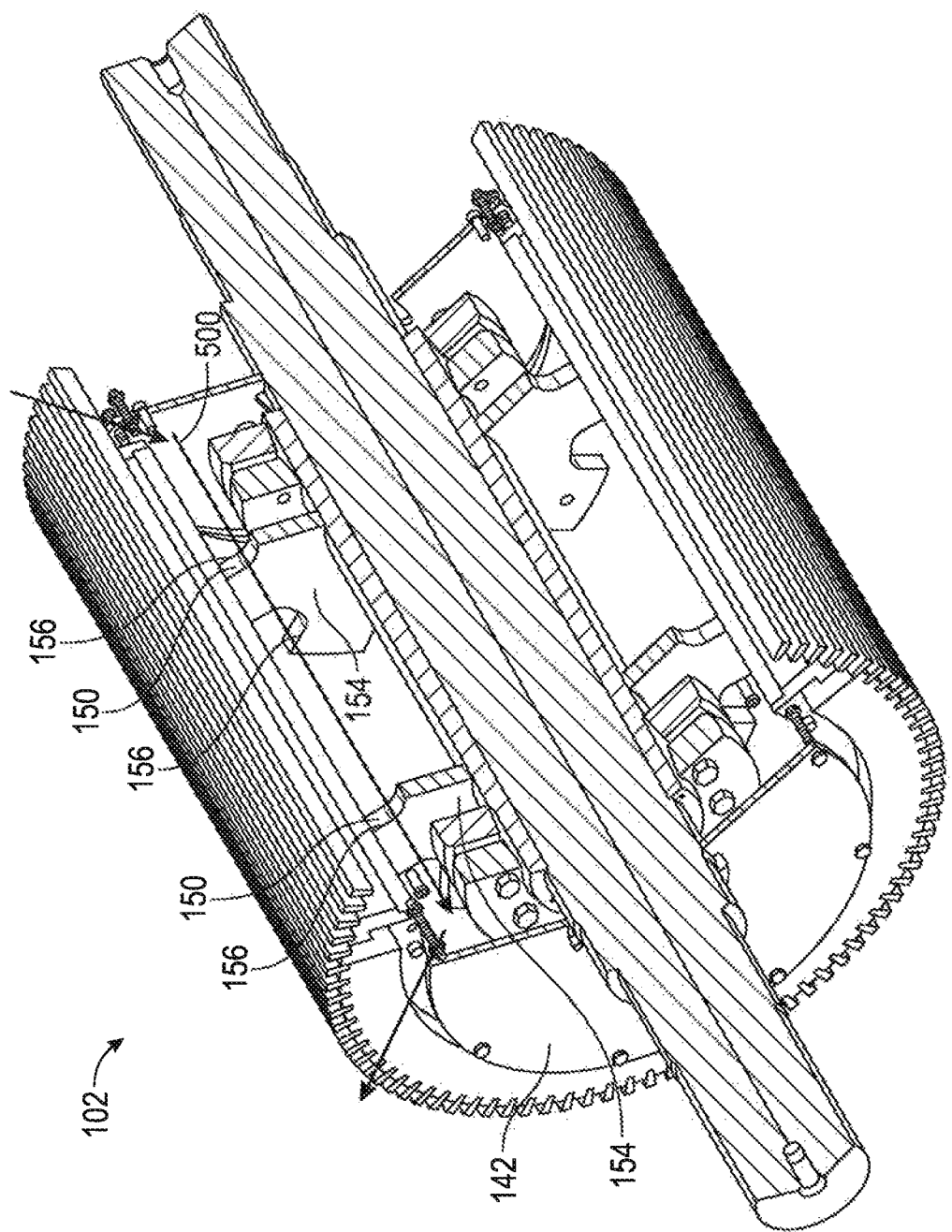
FIG. 23 is a cut-away, perspective view of another rotor configuration of the exemplary motor of FIG. 1A.
Figure 24:
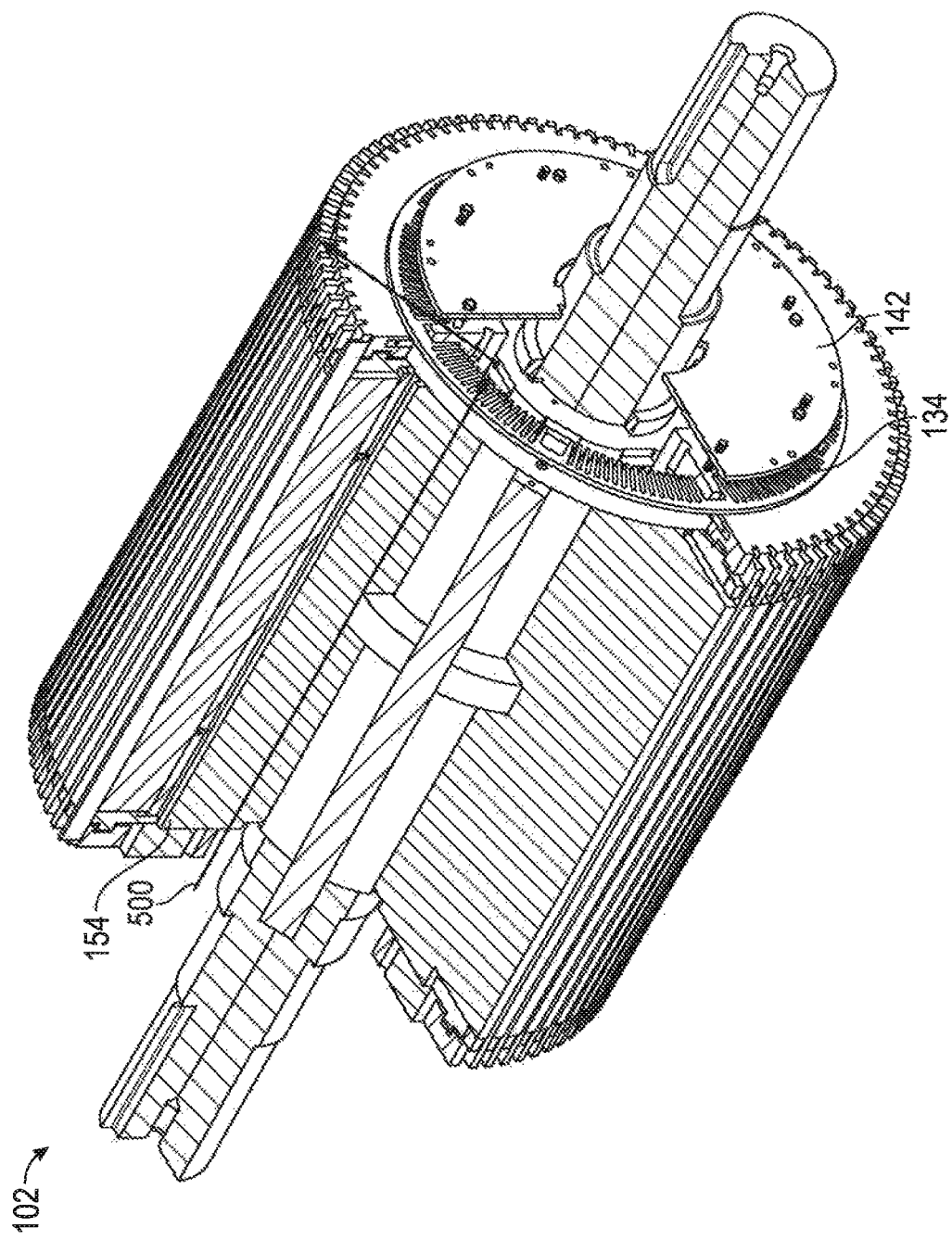
FIG. 24 is a cut-away, perspective view of another rotor configuration of the exemplary motor of FIG. 1A.

Referring to FIGS. 19 and 20, the terminal box assembly 300 may house various electronic and control components 302 for controlling the motor assembly 100 and/or fan module assembly 400 during operation and advantageously partitions the electronic and control components 302 in a separate compartment 304 away from both the motor assembly 100 and fan module assembly 400. The terminal box assembly 300 may include one or more covers 306 to provide access to the electronic and control components 302 housed therein and may advantageously employ gaskets at interfaces between the one or more covers 306 and the body of the terminal box assembly 300 to protect the electronic and control components 302 housed therein from the contaminants such as moisture, dust and the like.

With reference to FIGS. 1A-1C, 2A-2C and 21, the fan module assembly 400 comprises a fan housing 402. The fan module assembly 400 is mounted to the top of motor housing 200, as discussed above, with the fan housing 402 being in fluid communication with the air outlet 204 of the motor housing 200 through housing openings 404. The fan module assembly 400 may be removably attached to the motor housing 200 by latches 406 to advantageously allow for relatively easy removal of the fan module 400 from the motor housing 200 for maintenance, repair and the like. Alternatively, the fan module assembly 400 may be attached to the motor housing 200 through any other securing mechanism, in either a removable or permanent manner, including, without limitation, nuts and bolts, welding, hooks, hand adjustable clamps, elastic members, holes with pegs, or the like as should be readily understood by those skilled in the art. The fan module assembly 400 includes at least one blower 408. As seen in FIGS. 1A-1C, the fan module assembly 400 may be configured with each inlet 410 of each blower 408 fluidly connected to an area exterior of the motor 10 and each outlet 412 connected to the fan housing 402 to blow cooling air into the fan housing 402. Alternatively, as seen in FIGS. 2A-2C, the inlets 410 of the blowers 408 are fluidly connected to the fan housing 402 and the outlets 412 of the blowers 408 are fluidly connected with an area exterior of the motor 10 to draw cooling air out of the fan housing 402.

The latches 406 advantageously allow the fan module assembly 400 to be quickly assembled or disassembled from the motor housing 200 without the use of tools by actuating the latches 406 from a secured position to an unsecured position and vice versa. When the latches 406 are in the secured position, the fan module assembly 400 is secured to the motor housing 200 and when the latches are in the unsecured position, the fan module assembly 400 may be removed from the motor housing 200. Thus, by removing the fan module assembly 400, access to the motor assembly 100 is readily attainable through the air outlet 204 of the motor housing 200, both shown in FIG. 6, for maintenance and repair purposes or the like.

In operation of the motor 10, the motor assembly 100 runs and is controlled in the same manner as any typically known motor including variable speed devices (i.e. VFDs). During operation, the blowers 408 may be configured to use negative pressure to cool the motor assembly 100 by pulling air out of the motor housing 200, as shown in FIGS. 2A-2C. Specifically, air enters the motor housing 200 through the air inlets 202 of the motor housing 200, passes through and cools the motor assembly 100, passes into the fan housing 402 through the housing openings 404 in the bottom thereof, passes into the blowers 408 via blower inlets 410 and is expelled from the motor 10 through the blower outlets 412. Additionally, during operation, the fan housing 402 provides noise reduction benefits by dampening sounds caused by operation of the motor 10. Alternatively, as shown in FIGS. 1A-1C, the blowers 408 may be configured to use positive pressure to cool the motor assembly 100 by pushing air into the motor housing 200. Specifically, air enters the fan module assembly 400 via the blowers 408, passes into the fan housing 402, passes through the housing openings 404 and into the motor housing 200, passes through and cools the motor assembly 100 and is expelled from the motor 10 through air inlets 202. This configuration is an instance where, as discussed above, the air inlets 202 serve as an outlet for air moving through the motor housing 200.

Figure 5:
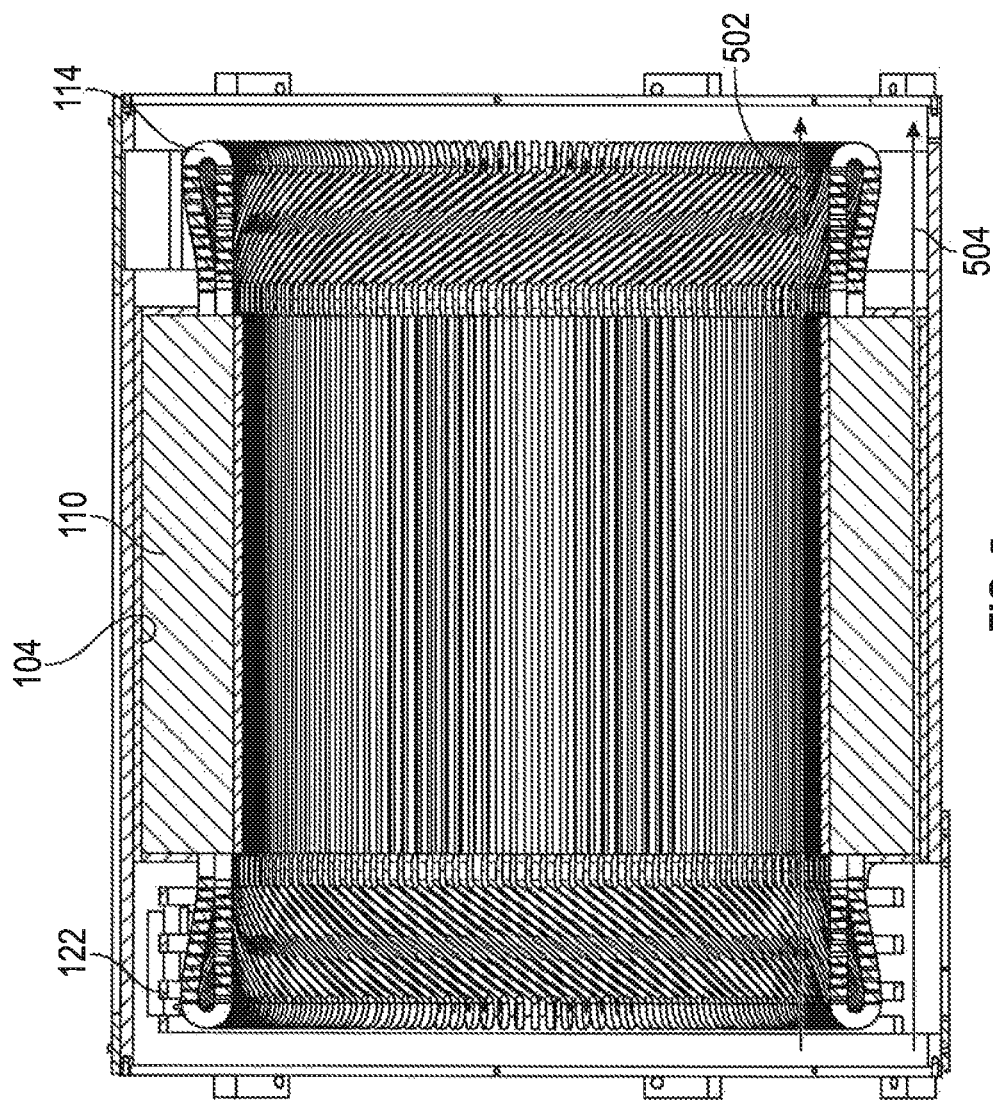
FIG. 5 is a cross-sectional, side view of the stator and motor housing of FIG. 4A along section line A-A.
Figure 25:
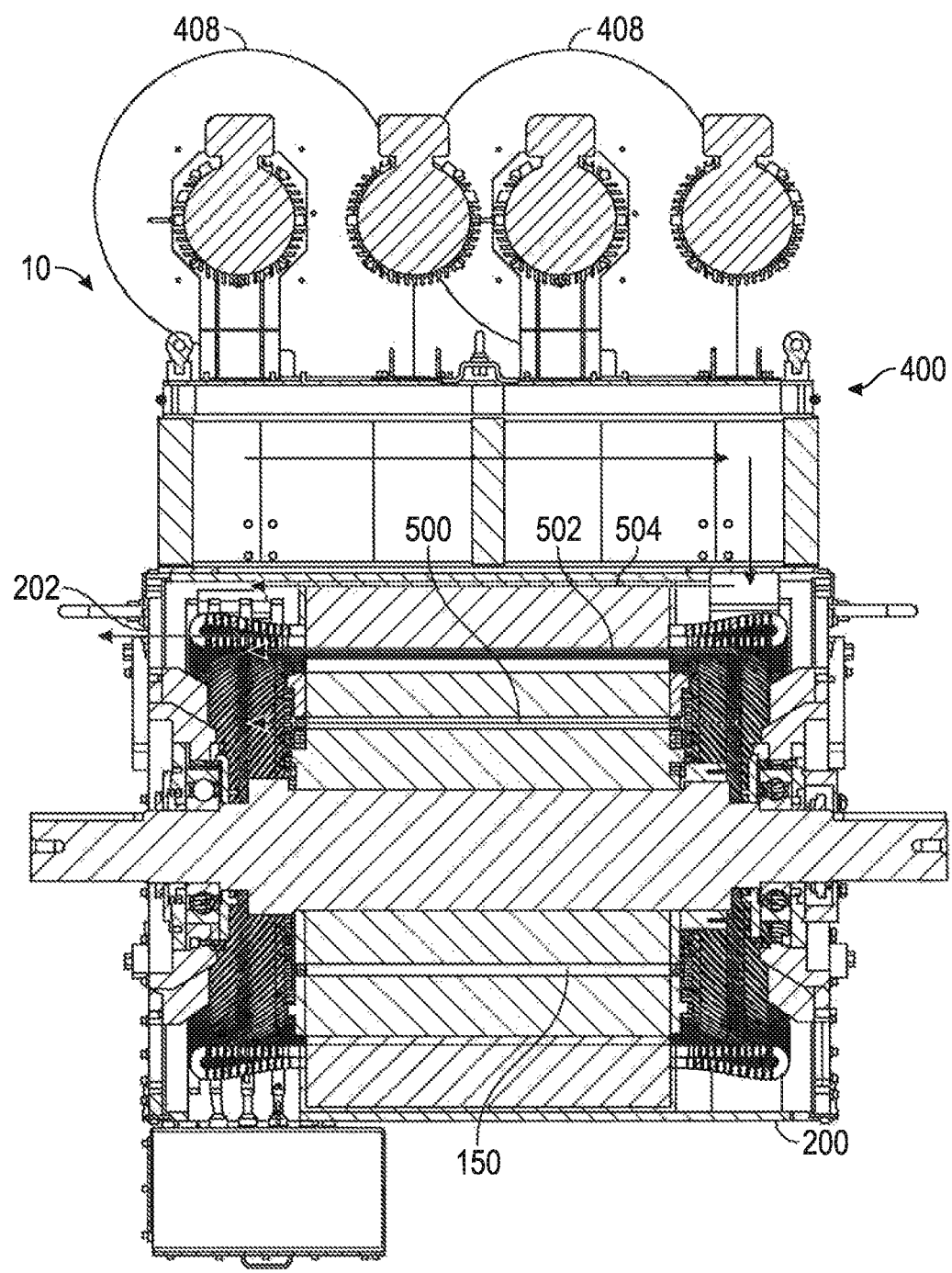
FIG. 25 is cross-sectional, side view of the exemplary motor of FIG. 1A.

The motor 10 has at least three separate cooling paths that air passes through to cool the motor 10. The first cooling path 500, shown in FIGS. 10 and 22-24, is through the inside of the rotor 102, i.e. through the rotor core 124 by passing around an outer edge of the deflector plate 142 and/or through air vents 148, then through vent holes 156 and rotor vents 150. The cooling air then passes to the air outlet 204 where the cooling air exits the motor housing 200 into the fan housing 402 through the housing openings 404. The second cooling path 502 and third cooling path 504 are shown in FIG. 5. The second cooling path 502 is between the stator 104 and the rotor 102. Specifically, the cooling air passes through the inside of the stator 104 through the stator channels 120 in the stator slots 112 and around the exterior of the rotor 102. The third cooling path 504, also shown in FIG. 5, is around the outside of the stator 104 and within the motor housing 200. While the cooling paths 500, 502, 504 are illustrated with arrows pointing in a given direction, it should be understood that depending on the configuration of the fan module assembly 400 and desired operation of the motor 10, cooling air may travel in the same cooling paths 500, 502, 504 but move in the opposite direction than is shown in any of the Figures. For example, FIG. 25 shows arrows representing air flow during operation of the motor shown in FIG. 1A. The direction of the air flow would be in the opposite direction than all of the arrows shown in FIG. 25 if the fan module assembly 400 were configured to pull air through the motor housing 200 as discussed above.

The present disclosure advantageously provides a motor 10 with improved cooling of not only the rotor 102, but also its stator 104 by increasing a quantity and/or rate of air that contacts the stator 104 during operation, and by providing stator channels 120 in close proximity to heat generating components of the stator 104. For example, since the coils 116 are disposed in the vicinity of the stator channels 120, the stator channels 120 are able to provide an increased amount of cooling air near the coils 116, thereby increasing efficacy of available cooling air flow.

The present disclosure advantageously provides a negative pressure cooling system and method that minimizes acoustic noise usually generated at blower inlets at the expense of reduced air mass flow and mass flow sensitivity to motor outlet air temperature. While negative pressure pulling air through the motor 10 may be advantageous for noise reduction purposes, one skilled in the art should readily understand that, in accordance with principles of the present disclosure, the blowers 408 may be configured to instead use positive pressure to push air through the motor 10, as shown in FIGS. 1A-1C, which may provide superior heat removal.

Using negative pressure to cool the motor 10 by generating a vacuum that pulls air out of the motor housing 200, as opposed to using positive pressure to pump air into the motor housing 200, advantageously provides for more efficient cooling having better flow characteristics. Additionally, the implementation of negative pressure advantageously provides a much quieter cooling system. Further, in accordance with principles of the present disclosure, the superior heat removal aspects of a motor 10 also allow the blowers 408 of the fan module assembly 400 to operate at lower speeds and, thus, lower air velocity and/or quantities, which thereby provides further noise dampening advantages.

The present disclosure advantageously describes a motor 10 that can be suitably modified for a wide range of sizes and/or motor capacities due to the improved airflow, cooling and stability discussed above. Thus, embodiments in accordance with the present disclosure are advantageously scalable in size to achieve a variety of different applications. The various structural and cooling aspects discussed above advantageously allow the motor 10 to be provided at a much smaller size and weight as compared to comparably powered devices by trading-off, for example, efficiency for size, weight and material. High power density motors are advantageous for applications where size and/or weight requirements of the motor must be kept low, but power output requirements of the motor are high.

While the present disclosure has been illustrated and described with respect to particular embodiments thereof, it should be appreciated by those of ordinary skill in the art that various modifications to this disclosure may be made without departing from the spirit and scope of the present disclosure. For example, while the present disclosure shows and describes an AC induction motor well-suited for high power density motor applications, it should be readily understood that principles of the present disclosure can be applied to other motor applications such as DC motor applications and also applications where, for example, space constraints are not a significant consideration.

What is claimed is:

1. A motor comprising:
a stator including a plurality of stator slots having stator coils disposed therein; and
a rotor rotatable within the stator about a central axis;
wherein the stator includes a plurality of stator channels formed adjacent to the stator slots and extending in the axial direction of the central axis, each stator channel located between a stator coil and the rotor;
wherein the rotor includes a rotor core and a plurality of concentric rotor vents extending therethrough from one axial end to the other;
wherein an airflow path through the inside of the rotor includes passages formed through the plurality of rotor vents; and
wherein at least one adjustable deflector plate attached to an axial end of the rotor core and configured to move axially in and out relative to the rotor core controls fluid flow through the airflow path through the inside of the rotor.

2. The motor according to claim 1, wherein the stator coils are recessed within the stator slots.

3. The motor according to claim 1, wherein the plurality of stator channels increase an exposed surface area of the stator in the vicinity of the stator coils.

4. The motor according to claim 1, wherein the motor is an AC induction motor.

5. The motor according to claim 1, wherein at least one turbulator is disposed within at least one rotor vent of the plurality of rotor vents.

6. The motor according to claim 1, wherein the motor further comprises a motor housing and wherein the plurality of stator channels form an airflow path in the motor housing that increases an exposed surface area of the stator in the vicinity of the stator coils.

7. A motor comprising:
a stator including a plurality of stator slots having stator coils disposed therein; and
a rotor rotatable within the stator about a central axis;
wherein the stator includes a plurality of stator channels formed adjacent to the stator slots and extending in the axial direction of the central axis, each stator channel located between a stator coil and the rotor;
wherein the motor further comprises a motor housing and wherein the plurality of stator channels form an airflow path in the motor housing that increases an exposed surface area of the stator in the vicinity of the stator coils; and
wherein the motor further comprises a fan module assembly, wherein the fan module assembly comprises at least one latch that is configured to be actuated from a secured position to an unsecured position, and vice versa, the at least one latch securing the fan module assembly to the motor housing when the latch is in a secured position and allowing the fan module assembly to be removed from the motor housing when the latch is in the unsecured position.

8. The motor according to claim 7, wherein the stator coils are recessed within the stator slots.

9. The motor according to claim 7, wherein the plurality of stator channels increase an exposed surface area of the stator in the vicinity of the stator coils.

10. The motor according to claim 7, wherein the motor is an AC induction motor.

11. The motor according to claim 7, wherein the rotor includes a rotor core and a plurality of concentric rotor vents extending therethrough from one axial end to the other; and
wherein an airflow path through the inside of the rotor includes passages formed through the plurality of rotor vents.

12. The motor according to claim 11, wherein at least one turbulator is disposed within at least one rotor vent of the plurality of rotor vents.

13. A machine comprising:
a motor housing;
a stator mounted within the motor housing;
a rotor rotatable within the stator about a central axis, the rotor comprising a rotor core and a plurality of concentric rotor vents extending therethrough from one axial end of the rotor core to the other; and
a fan module assembly comprising a fan housing and at least one blower, the fan housing being mounted to the motor housing so that an interior of the fan housing is fluidly connected to an interior of the motor housing;
wherein the at least one blower is coupled to an exterior wall of the fan housing and is configured to transfer air between an exterior of the fan housing and the interior of the fan housing to move air through the fan housing, motor housing and through an airflow path through the inside of the rotor that includes passages formed through the plurality of rotor vents: and
wherein at least one adjustable deflector plate attached to an axial end of the rotor core and configured to move axially in and out relative to the rotor core controls fluid flow through the airflow path through the inside of the rotor.

14. The machine according to claim 13, wherein the motor housing includes at least one opening formed therethrough through which the air is moved.

15. The machine according to claim 14, wherein the at least one blower is positioned to blow air into the fan housing, through the motor housing and the airflow path through the inside of the rotor and out the opening formed in the motor housing.

16. The machine of claim 14, wherein the fan module assembly comprises at least one latch that is configured to be actuated from a secured position to an unsecured position, and vice versa, the at least one latch securing the fan module assembly to the motor housing when the latch is in a secured position and allowing the fan module assembly to be removed from the motor housing when the latch is in the unsecured position.

17. The machine according to claim 13, wherein at least one turbulator is disposed within at least one rotor vent of the plurality of rotor vents.

18. The machine according to claim 13, wherein the stator includes a plurality of stator slots having coils disposed therein and a plurality of stator channels formed adjacent the stator slots and extending in the axial direction of the central axis.

19. The machine according to claim 18, wherein the plurality of stator channels form a second airflow path in the motor housing that increases an exposed surface area of the stator in the vicinity of the stator coils.

20. The machine according to claim 13, wherein the machine is an AC induction motor.

21. A machine comprising:
a motor housing;
a stator mounted within the motor housing;
a rotor rotatable within the stator about a central axis, the rotor comprising a rotor core and a plurality of concentric rotor vents extending therethrough from one axial end of the rotor core to the other; and
a fan module assembly comprising a fan housing and at least one blower, the fan housing being mounted to the motor housing so that an interior of the fan housing is fluidly connected to an interior of the motor housing;
wherein the at least one blower is coupled to an exterior wall of the fan housing and is configured to transfer air between an exterior of the fan housing and the interior of the fan housing to move air through the fan housing, motor housing and through an airflow path through the inside of the rotor that includes passages formed through the plurality of rotor vents; and
wherein the fan module assembly comprises at least one latch that is configured to be actuated from a secured position to an unsecured position, and vice versa, the at least one latch securing the fan module assembly to the motor housing when the latch is in a secured position and allowing the fan module assembly to be removed from the motor housing when the latch is in the unsecured position.

22. The machine according to claim 21, wherein the motor housing includes at least one opening formed therethrough through which the air is moved.

23. The machine according to claim 21, wherein at least one turbulator is disposed within at least one rotor vent of the plurality of rotor vents.

24. The machine according to claim 21, wherein the stator includes a plurality of stator slots having coils disposed therein and a plurality of stator channels formed adjacent the stator slots and extending in the axial direction of the central axis.

25. The machine according to claim 24, wherein the plurality of stator channels form a second airflow path in the motor housing that increases an exposed surface area of the stator in the vicinity of the stator coils.

* * * * *